United States Patent [19]

Chan et al.

[11] Patent Number: 6,005,942
[45] Date of Patent: Dec. 21, 1999

[54] SYSTEM AND METHOD FOR A MULTI-APPLICATION SMART CARD WHICH CAN FACILITATE A POST-ISSUANCE DOWNLOAD OF AN APPLICATION ONTO THE SMART CARD

[75] Inventors: Alfred Chan, Daly City; Marc B. Kekicheff, Palo Alto; Joel M. Weise, Burlingame; David C. Wentker, San Francisco, all of Calif.

[73] Assignee: Visa International Service Association, Foster City, Calif.

[21] Appl. No.: 09/046,993

[22] Filed: Mar. 24, 1998

Related U.S. Application Data

[60] Provisional application No. 60/061,763, Oct. 14, 1997, and provisional application No. 60/041,468, Mar. 24, 1997.

[51] Int. Cl.$^6$ .............................. H04L 9/00; H04L 9/08; G07F 7/08
[52] U.S. Cl. .................. 380/25; 380/9; 380/21; 380/23; 380/24; 380/29; 380/30; 380/49; 380/50; 235/379; 235/380
[58] Field of Search ................................. 380/4, 23, 24, 380/25, 49, 50, 59, 9, 21, 29, 30; 235/379, 380, 382; 379/93.01, 93.05, 93.06, 93.12

[56] References Cited

U.S. PATENT DOCUMENTS

| | | | |
|---|---|---|---|
| 4,742,215 | 5/1988 | Daughters et al. | 235/487 |
| 5,332,889 | 7/1994 | Lundstrom et al. | 235/380 |
| 5,378,884 | 1/1995 | Lundstrom et al. | 235/380 X |
| 5,530,232 | 6/1996 | Taylor | 235/380 |
| 5,583,933 | 12/1996 | Mark | 380/9 X |

FOREIGN PATENT DOCUMENTS

| | | |
|---|---|---|
| E 100227 | 11/1994 | Austria . |
| 0193635 A1 | 9/1986 | European Pat. Off. . |
| 19607363 A1 | 9/1996 | Germany . |

OTHER PUBLICATIONS

EPO, International Search Report, Jul. 3, 1998, International Application No. PCT/US 98/05674.
Carol Hovenga Fancher,"In Your Pocket Smart Cards", Feb. 1997, IEEE.
Chaum et al., "Smart Card 2000: The Future of IC Cards", Oct. 19, 1987, Elsevier Science Publishers B.V.
Steven Levy, "E–Money (That's What I Want)", Dec. 1994, Wired Magazine.
Carol H. Fancher, "Smart Cards as Potential Applications Grow, Computers in the Wallet are Making Unobtrusive Inroads", Aug. 1996, Scientific American Website.
Jerome Svigals, "Smart Cards The New Bank Cards", 1985, MacMillan Publishing Company.
Roy Bright, "Smart Cards: Principles, Practice, Applications", 1988, Ellis Horwood Limited.
Jerome Svigals, "Smart Cards The Ultimate Personal Computer", 1985, MacMillan Publishing Company.
Hawkes et al., "Integrated Circuit Cards, Tags and Tokens", 1990, BSP Professional Books.
Hiro Shogase, "The Very Smart Card: A Plastic Packet Bank", Oct. 1988, IEEE Spectrum.
David Naccache, "Cryptographic Smart Cards", Jun. 3, 1996, IEEE Micro 1996 Website.
Zoreda et al., "Smart Cards", 1994, Artech House.
"Identification Card Systems—Inter–Sector Electronic Purse Part 1: Concepts and Structures", 1994, European Standard, prEN 1546.
"Identification Card Systems—Inter–Sector Electronic Purse Part 2: Security Architecture", 1994, European Standard, prEN XXXXX–2.
"Identification Card Systems—Inter–Sector Electronic Purse Part 3: Data Elements and Interchanges", 1994, European Prestandard, prEN 1546–3.
"Identification Card Systems—Inter–Sector Electronic Purse Part 4: Devices", 1994, European Prestandard, prEN 1546–4.
"Identification Cards—Integrated Circuit(s) Cards With Contacts Part 1: Physical Characteristics", 1987, International Standard, ISO 7816–1, First Edition.
"Identification Cards—Integrated Circuit(s) Cards With Contacts Part 2: Dimensions and Location of the Contacts", 1988, International Standard, ISO 7816–2, First Edition.
"Identification Cards—Integrated Circuit(s) Cards With Contacts Part 3: Electronic Signals and Transmission Protocols", International Standard, ISO/IEC 7816–3, First Edition.
"Identification Cards—Integrated Circuit(s) Cards With Contacts Part 4: Inter–Industry Commands for Interchange", International Standard, ISO/IEC 7816–4, First Edition.
"Identification Cards—Integrated Circuit(s) Cards With Contacts Part 5: Numbering System and Registration Procedure for Application Identifiers", 1993, International Standard, ISO/IEC DIS 7816–5.
"Identification Cards—Physical Characteristics", 1995, International Standard, ISO/IEC 7810, Second Edition.
"Identification Cards–Recording Technique—Part 1: Embossing", 1995, International Standard, ISO/IEC 7811–1, Second Edition.

(List continued on next page.)

*Primary Examiner*—Bernarr E. Gregory
*Attorney, Agent, or Firm*—Beyer & Weaver, LLP

[57] ABSTRACT

A system and method allow card issuers to securely add applications during the lifetime of the card after the card has already been issued (post issuance). Loading of an application and/or objects from an application server via a card acceptance device (and its supporting system infrastructure delivery mechanism) onto a card post issuance is performed in a secure and confidential manner. A smart card includes a card domain application that manages the card. Any number of security domain applications on the card provide security for loaded applications by managing keys; each application is associated with a security domain. Each of the card domain and security domains has a command interface for off-card communication, and an API for internal card use. The card life cycle includes the states of masked, initialized, load secured and blocked. An application life cycle includes the states of not available, loaded, installed, registered, personalized, activated and blocked. An application can block the card.

24 Claims, 15 Drawing Sheets

OTHER PUBLICATIONS

"Identification Cards–Recording Technique–Part 2: Magnetic Stripe", 1995, International Standard, ISO/IEC 7811–2, Second Edition.

"Identification Cards–Recording Technique–Part 3: Location of Embossed Characters on ID–1 Cards", 1995, International Standard, ISO/IEC 7811–4, Second Edition.

"Identification Cards–Recording Technique–Part 5: Location of Read–Write Magnetic Track—Track 3", 1995, International Standard, ISO/IEC 7811–5, Second Edition.

"Identification Cards–Recording Technique–Part 6: Magnetic Stripe–High Coercivity", 1996, International Standard, ISO/IEC 7811–6, First Edition.

"Identification Cards–Financial Transaction Cards", 1990, International Standard, ISO/IEC 7813, Fourth Edition.

"Identification Cards—Financial Transaction Cards Amendment 1", 1996, International Standard, ISO/IEC 7813, Fourth Edition.

"Identification Cards—Countless Integrated Circuit(s) Cards—Part 1: Physical Characteristics", 1992, International Standard, ISO/IEC 10536–1, First Edition.

"Identification Cards—Contactless Integrated Circuit(s) Cards—Part 2: Dimensions and Location of Coupling Areas", 1995, International Standard, ISO/IEC 10536–2, First Edition.

SYSTEM AND METHOD FOR A MULTI-APPLICATION SMART CARD WHICH CAN FACILITATE A POST-ISSUANCE DOWNLOAD OF AN APPLICATION ONTO THE SMART CARD

CROSS REFERENCE TO RELATED APPLICATIONS

This application claims priority to U.S. provisional application Ser. No. 60/061,763 filed Oct. 14, 1997, which is herein incorporated by reference. This application further claims priority to U.S. provisional application Ser. No. 60/041,468 filed Mar. 24, 1997, which is also herein incorporated by reference.

This application is related to U.S. application Ser. No. 09/046,994, filed on Mar. 24, 1998 which is also herein incorporated by reference for all purposes.

FIELD OF THE INVENTION

The present invention relates to smart cards. In particular, the present invention relates to a system and method for providing a multi-application smart card which can facilitate a post-issuance download of an application onto the smart card.

BACKGROUND OF THE INVENTION

A smart card is typically a credit card-sized plastic card that includes a semiconductor chip capable of holding data supporting multiple applications.

Physically, a smart card often resembles a traditional "credit" card having one or more semiconductor devices attached to a module embedded in the card, providing contacts to the outside world. The card can interface with a point-of-sale terminal, an ATM, or a card reader integrated into a telephone, a computer, a vending machine, or any other appliance.

A micro-controller semiconductor device embedded in a "processor" smart card allows the card to undertake a range of computational operations, protected storage, encryption and decision making. Such a micro-controller typically includes a microprocessor, memory, and other functional hardware elements. Various types of cards are described in "The Advanced Card Report: Smart Card Primer", Kenneth R. Ayer and Joseph F. Schuler, The Schuler Consultancy, 1993.

One example of a smart card implemented as a processor card is illustrated in FIG. 1. Of course, a smart card may be implemented in many ways, and need not necessarily include a microprocessor or other features. The smart card may be programmed with various types of functionality, including applications such as stored-value; credit/debit; loyalty programs; etc.

In some embodiments, smart card 5 has an embedded micro-controller 10 that includes a microprocessor 12, random access memory (RAM) 14, read-only memory (ROM) 16, non-volatile memory 18, a cryptographic module 22, and a card reader interface 24. Other features of the micro-controller may be present but are not shown, such as a clock, a random number generator, interrupt control, control logic, a charge pump, power connections, and interface contacts that allow the card to communicate with the outside world.

Microprocessor 12 is any suitable central processing unit for executing commands and controlling the device. RAM 14 serves as storage for calculated results and as stack memory. ROM 16 stores the operating system, fixed data, standard routines, and look up tables. Non-volatile memory 18 (such as EPROM or EEPROM) serves t o store information that must not be lost when the card is disconnected from a power source but that must also be alterable to accommodate data specific to individual cards or any changes possible over the card lifetime. This information might include a card identification number, a personal identification number, authorization levels, cash balances, credit limits, etc. Cryptographic module 22 is an optional hardware module used for performing a variety of cryptographic algorithms. Card reader interface 24 includes the software and hardware necessary for communication with the outside world. A wide variety of interfaces are possible. By way of example, interface 24 may provide a contact interface, a close-coupled interface, a remote-coupled interface, or a variety of other interfaces. With a contact interface, signals from the micro-controller are routed to a number of metal contacts on the outside of the card which come in physical contact with similar contacts of a card reader device.

Various mechanical and electrical characteristics of smart card 5 and aspects of its interaction with a card reading device are defined by the following specifications, all of which are herein incorporated by reference.

*Visa Integrated Circuit Card Specification*, (Visa International Service Association 1996).

*EMV Integrated Circuit Card Specification for Payment Systems*, (Visa International Service Association 1996).

*EMV Integrated Circuit Card Terminal Specification for Payment Systems*, (Visa International Service Association 1996).

*EMV Integrated Circuit Card Application Specification for Payment Systems*, (Visa International Service Association 1996).

*International Standard, Identification Cards—Integrated Circuit(s) Cards with Contacts, Parts* 1–6 (International Standards Organization 1987–1995).

Prior to issuance of a smart card to a card user, the smart card is initialized such that some data is placed in the card. Initialization refers to the population of non-volatile memory with data that is common to a large number of cards while also including a minimal amount of card unique terms (e.g. card serial number and personalization keys). For example, during initialization, the smart card may be loaded with at least one application, such as credit or stored cash value, a file structure initialized with default values, and some initial cryptographic keys for transport security. Once a card is initialized, it is typically personalized. During personalization, the smart card is loaded with data which uniquely identifies the card. For example, the personalization data can include a maximum value of the card, a personal identification number (PIN), the currency in which the card is valid, the expiration date of the card, and cryptographic keys for the card.

A limitation of conventional smart cards is that new applications typically can not be added to an issued smart card. Smart cards are traditionally issued with one or more applications predefined and installed during the manufacturing process of the card. As a result, with traditional smart card implementation, once a card has been issued to a card user, the smart card becomes a fixed application card. If a new application is desired, the smart card is typically discarded and a new smart card, which includes the new application, is issued.

It would be desirable to provide a smart card which would allow applications to be loaded after the card is issued.

Further, it is desirable to provide a mechanism to manage the loading of an application as well as general management of the applications on the smart card. Additionally, it is desirable to allow an application provider to keep cryptographic keys confidential from the issuer of the smart card and to securely allow applications from different entities to coexist on a card.

SUMMARY OF THE INVENTION

Embodiments of the present invention teach a system and method which allow card issuers to add applications during the lifetime of the card after the card has already been issued (referred to herein as post issuance loading). Downloading an application after the card has been issued to the card holder will be referred to herein as a "secure install" process.

The system and method according to embodiments of the present invention allow the post issuance loading of an application and/or objects from an application server via a card acceptance device and its supporting system infrastructure delivery mechanism onto a card in a secure and confidential manner.

An embodiment of the present invention provides a system and method for controlling at least one function associated with an issued smart card. In a multiapplication smart card, a privileged application, herein referred to as a card domain, manages multiple functions related to the smart card. Examples of these functions include card initialization, global card data, card life cycle, and secure installation of smart card applications.

A method according to an embodiment of the present invention for providing a first application onto an issued smart card comprises the steps of forwarding the first application to the issued smart card; and loading the first application onto the issued smart card, wherein the loading of the first application is managed by a second application.

In another aspect of the invention, a system according to an embodiment of the present invention for controlling at least one function associated with an issued smart card is disclosed. The system comprises a first application associated with the issued smart card; and a second application associated with the issued smart card, the second application being in communication with the first application, wherein the second application manages at least one function associated with the first application.

DETAILED DESCRIPTION OF THE PREFERRED EMBODIMENTS

The following description is presented to enable one of ordinary skill in the art to make and to use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
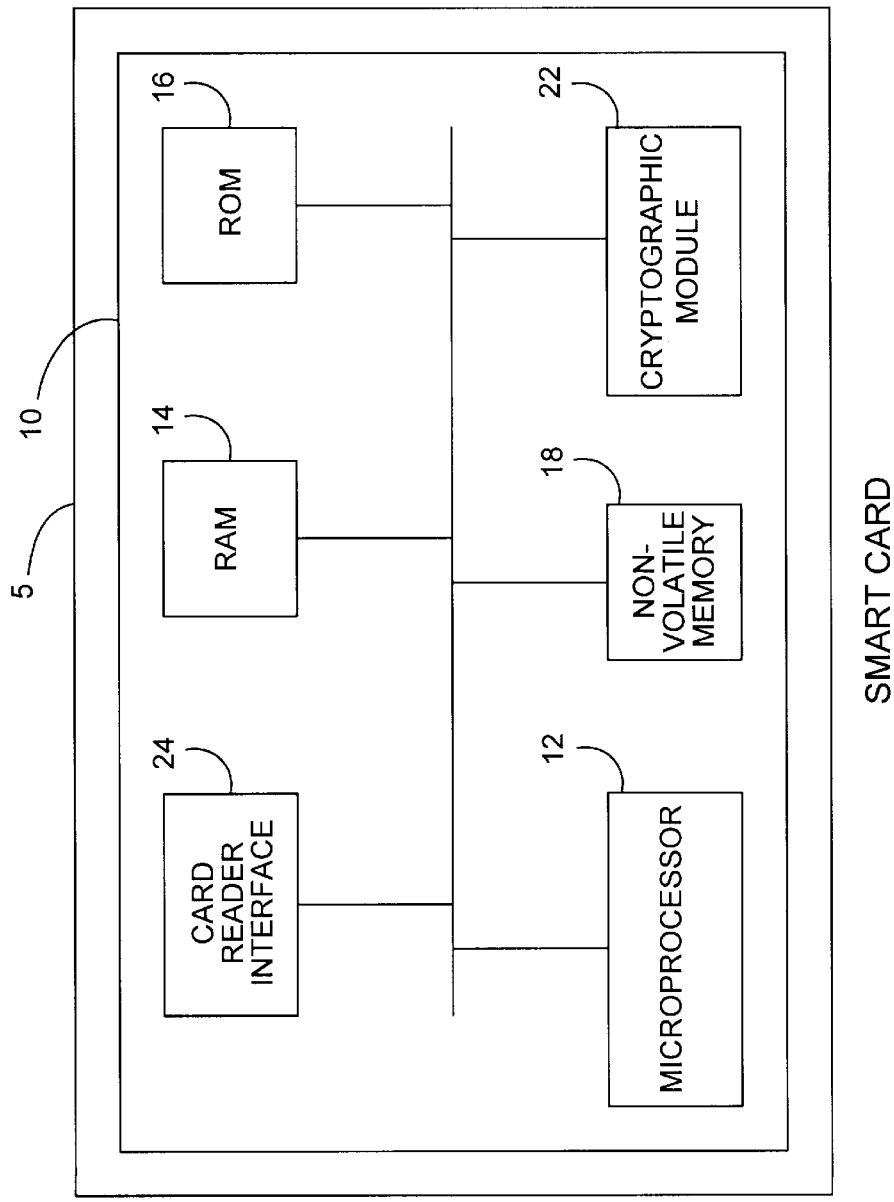
FIG. 1 is a block diagram of a smart card system suitable for implementing the present invention.
Figure 2:
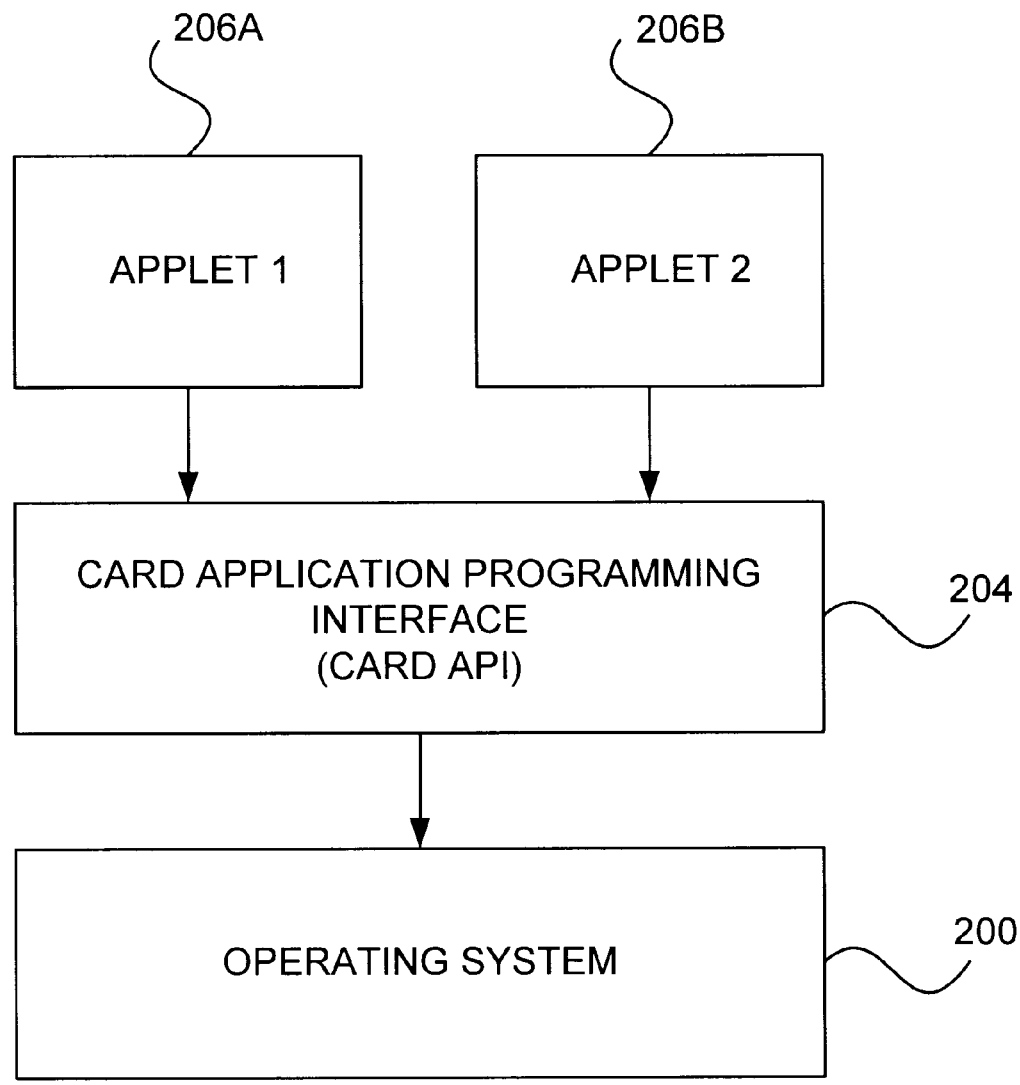
FIG. 2 is an example of a block diagram of software layers which can be utilized in a smart card.

FIG. 2 is a block diagram of an example of software layers which can be utilized in a smart card. The smart card shown in FIG. 2 includes an operating system 200, a card application programming interface (API) 204, and applications 206A–206B. Operating system 200 can include functionality to control the cards, memory management, input/output (I/O), and cryptographic features. Card API 204 utilizes the instructions from operating system 200 and writes these instructions into blocks which can be reused for common routines in multiple applications. Applications 206A and 206B can run on the smart card via instructions from API 204. These applications can include any application which can run on a smart card, such as stored value, credit, debit, transit, and loyalty.

One embodiment of the present invention is based upon the Java Card standard. In this case applications are referred to as 'Applets' and they are written to link to a Java Card API which is the application programming interface present on smart cards built to the Java Card standard.

Although the conventional software system shown in FIG. 2 allows for multiple applications, it does not solve the problem of how to securely load an application after issuance of the smart card to a user. If an application is to be loaded post issuance, a mechanism is needed to manage the loading of an application as well as the general management of the applications on the smart card. Additionally, an application provider may wish to keep cryptographic keys confidential from the issuer of the smart card. Accordingly, a mechanism is needed to provide for the separation of confidential information between an application provider and an issuer of a smart card. Embodiments of the present invention address such a need.

Figure 3A:
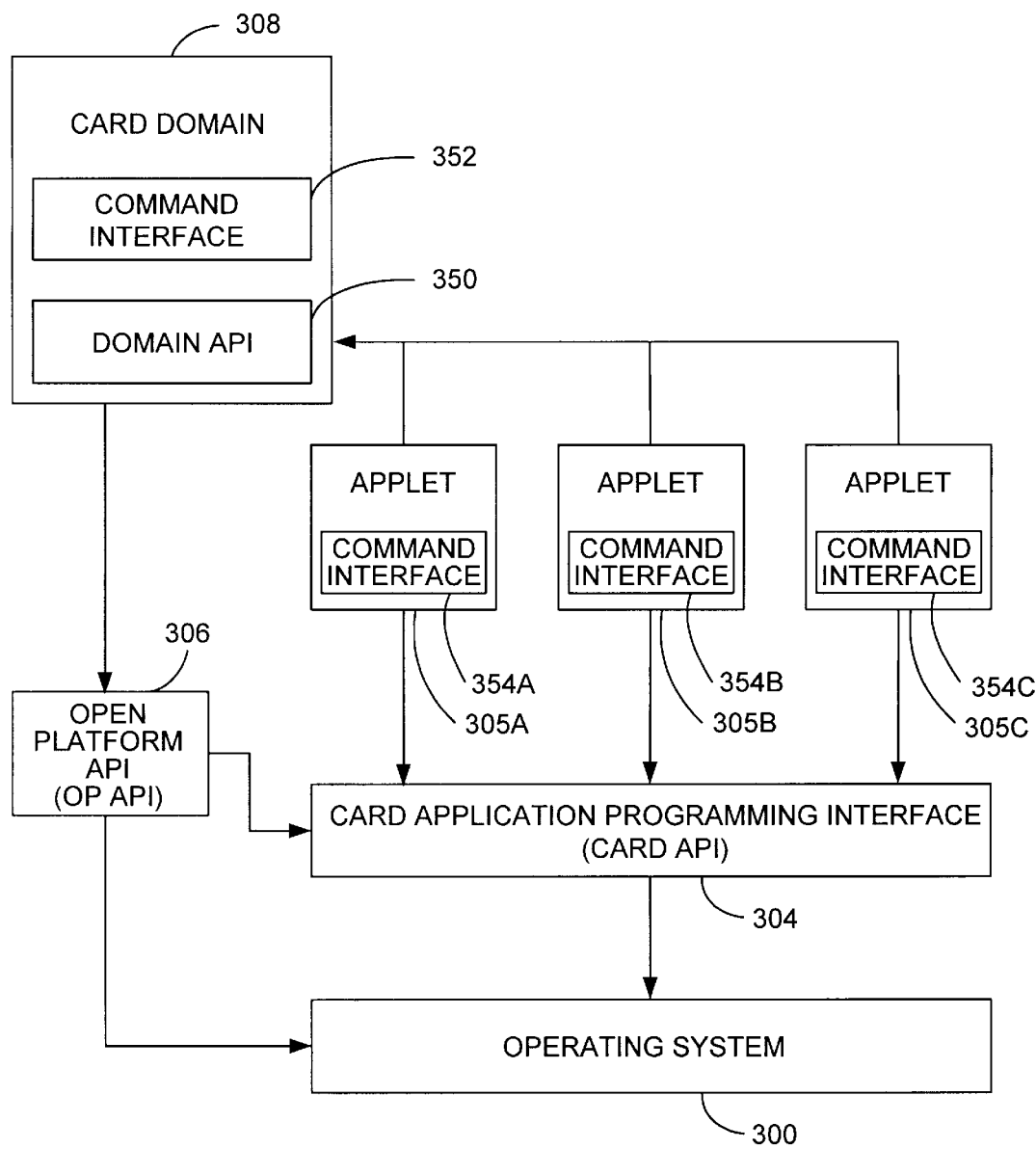
FIGS. 3A–3B are block diagrams of examples of software layers according to embodiments of the present invention.
Figure 3B:
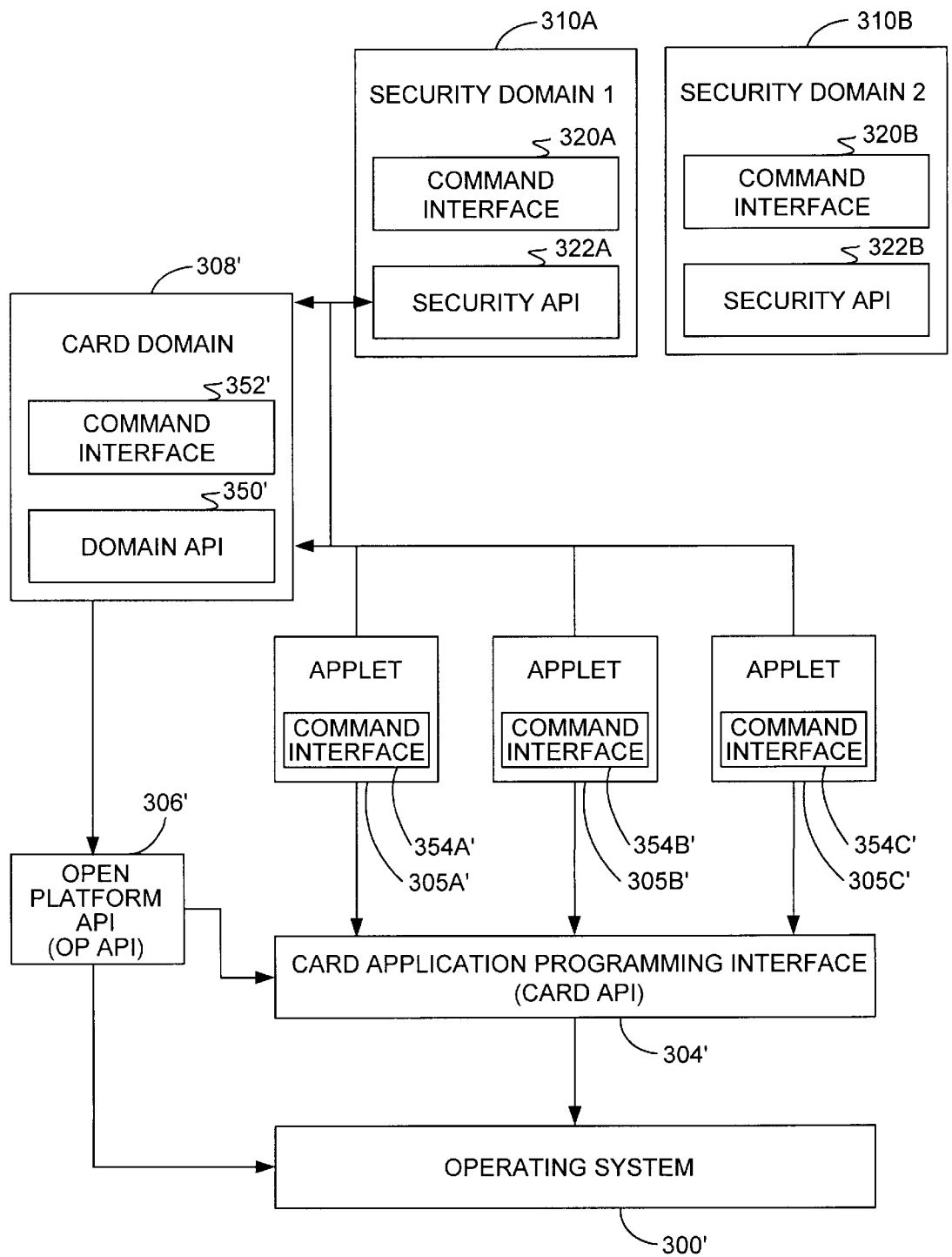

FIGS. 3A–3B are block diagrams showing software components of a smart card according to embodiments of the present invention. The arrows indicate dependencies between components. FIG. 3A shows an embodiment of a smart card utilizing a card domain, while FIG. 3B shows an embodiment of a smart card utilizing a security domain, as well as a card domain.

The example shown in FIG. 3A includes an operating system 300, a card API 304, applications 305A–305C, a card domain 308, and open platform (OP) API 306. The system shown in FIG. 3 allows for a secure and managed post issuance download of an application onto a smart card. A card domain is a card issuier's on-card control mechanism for a smart card according to the present invention.

Open platform API 306 classifies instructions into card domain 308 and security domains 310A–310B (shown in FIG. 3B). Accordingly, OP API 306 facilitates the formation of instructions into sets which can be identified as being included as part of card domain 308 and security domains 310A–310B.

Applications 305A–305C can include any application which can be supported by a smart card. Examples of these applications include credit, debit, stored value, transit, and loyalty. Applications 305A–305C are shown to include command interfaces, such as APDU interfaces 354A–354C which facilitate communication with the external environment. APDU stands for "Application Protocol Data Unit" and is a standard communication messaging protocol between a card acceptance device and a smart card. A command is a message sent by the terminal to the smart card that initiates an action and solicits a response from the smart card.

Applications 305A–305C can run on the smart card via instructions from card API 304. Card API 304 is implemented using the instructions from the card operating system and writes these instructions into blocks which can be reused for common routines for multiple applications. Those skilled in the art will recognize that a translation layer or interpreter may reside between API 304 and operating system 300. An interpreter interprets the diverse hardware chip instructions from vendor specific operating system 300 into a form which can be readily utilized by card API 304.

Card domain 308 can be a "privileged" application which represents the interests of the smart card issuer. As a "privileged" application, card domain 308 may be configured to perform multiple functions to manage various aspects of the smart card. For instance, card domain 308 can perform functions such as installing an application on the smart card, installing security domains 310A–310B (shown on FIG. 3B), personalization and reading of card global data, managing card life cycle states (including card blocking), performing auditing of a blocked card, maintaining a mapping of card applications 305A–305C to security domains 310A–310B, and performing security domain functions for applications 305A–305C which are not associated with a security domain 310.

Card domain 308 is shown to include an API 350 and a command interface, such as Application Protocol Data Unit (APDU) interface 352. APDU interface 352 facilitates interfacing with the external environment in compliance with, e.g., International Standards Organization (ISO) Standard 7816-4, entitled "Identification Cards—Integrated circuit(s) cards with contacts—Part 4, Inter-industry commands for interchange," which is herein incorporated by reference.

For example, APDU interface 352 can be used during post issuance installation of an application or during loading of card global data. An application load and install option is performed via a set of appropriate APDU commands received by card domain 308. API 350 facilitates interfacing with the internal smart card environment. For example, API 350 can be used if card domain 308 is being utilized as a default in place of a security domain 310, or if an application requires information such as card global data, key derivation data, or information regarding card life cycle. In other words, Card Domain 308 via API 350 also processes, APDUs for functions such as: reading ICC serial number, managing the card life cycle state including providing a card blocking service (the issuer is responsible for determining which applets, if any, can use the card blocking service), performing auditing for the card (when the card is blocked these are the only APDUs that will be handled), maintaining a mapping of security domains to applets, and acting as the security domain for the issuer's applets.

Memory allocations have been performed by the time an application is in an install state. An application is also personalized after loading and installing. A personalized application includes card holder specific data and other required data which allows the application to run. In addition to managing the installation and personalization of the application, card domain 308 can also manage global card information. Global card information includes information that several applications may need to perform their functions, such as card holder name and card unique data utilized in cryptographic key derivations. Card domain 308 can be a repository for the global card information to avoid storing the same data multiple times.

Card domain 308 can also manage card life cycle states including card blocking. The smart card will typically move through several states during its life cycle. Card domain 308 keeps track of what state the card is in during its life cycle. Card domain 308 may also manage a block request to block virtually all functions of the card. Further details of card domain 308 management of a block request will be discussed in conjunction with FIG. 6. Card domain 308 may also keep track of the state of an application during an application's life cycle. This kind of information regarding an application can be utilized during an auditing of a card. Auditing can be performed at any time during a card's lifetime. For instance, auditing may be performed after a card has been blocked or prior to installing a new application to validate the card contents. Although virtually all card functions are no longer functioning when a card is blocked, an issuer may be able to query card domain 308 for information regarding a state of an application or the life cycle state of the card. In this manner, the issuer of a card may still access a profile of the blocked card and its applications.

FIG. 3B shows an embodiment of the present invention utilizing a security domain 310, as well as card domain 308'. The example shown in FIG. 3B includes an operating system 300', a card API 304', applications 305A'–305C', security domains 310A–310B, a card domain 308', and open platform (OP) API 306'. The system shown in FIG. 3B also allows for a secure and managed post issuance download of an application onto a smart card.

Card domain 308' can work in conjunction with a security domain 310. Security domain 310 is a logical construct that can be implemented as an application to provide security related functions to card domain 308' and to applications associated with security domain 310. Security domains 310A–310B can assist in secure post issuance loading of an application onto the smart card. Security domains 310A–310B provide for a mechanism which keeps the application provider's confidential information, such as cryptographic keys, from being disclosed to the issuer of the smart card.

There may be multiple security domains 310 on a smart card, each represented by a unique cryptographic relationship. A security domain 310 is responsible for the management and sharing of cryptographic keys and the associated cryptographic methods which make up the security domain's cryptographic relationship. An application which is loaded to the smart card post issuance can be associated with a security domain, preferably with only one security domain. However, multiple applications may be associated with the same security domain 310. Applications installed on a smart card during the pre-issuance phase may optionally be associated with a security domain 310 on the smart card for purposes of loading confidential personalization data to those applications using security domain 310 keys. A security domain is the logical representation of an applet provider's encryption and signature keys on a smart card according to the present invention.

The software for security domain 310 may be installed by the card manufacturer at the time of card manufacturing (e.g., when the ROM is masked), or may be added during initialization or personalization stages. Security domains 310 can be implemented as selectable applications which are isolated from one another and the rest of the system. If security domain 310 is implemented in a Java card as an application, standard Java card security can be relied upon to ensure isolation of security domain 310. In addition, or alternatively, other security mechanisms such as hardware security can be utilized through OP API 306 implementation. OP API 306 may utilize special security features to enforce isolation of security domain 310. An example of such a security feature is the utilization of chip hardware security routines which may be employed by OP API 306.

Each security domain 310A–310B provides a command interface, such as an Application Protocol Data Unit (APDU) interface 320A–320B, for communication off card, and on card APIs 322A–322B.

The APDU interface 320A or 320B consists of personalization commands and is intended to allow the initial loading of security domain keys and to support key rotation if desired during the life of the security domain. APIs 322A–322B may include a signature verification method and decryption method which are shared with card domain 308' for post issuance loading of applications. Additionally, applications may utilize API interfaces 322A–322B for decrypting application confidential data. Note that card domain 308' may always function as a security domain and does so as the default.

Security domain 310 manages signing and decrypting keys and provides cryptographic services using those keys. Security domain 310 processes APDU's for numerous functions. These functions can include key management functions, e.g., functions to load or update keys. During a secure installation of an application, security domain 310 can provide services to card domain 308' to decrypt an application install file and check the signature of an application file. For an application associated with a security domain 310, that application's security domain 310 provides decrypt and signature functions, such as MACing on an update key APDU command during the personalization phase of a newly installed application. Thereafter, the application can use the updated key to decrypt and check signatures on subsequent key updates. An install file is a specific data construct format for downloading data onto smart cards on a post issuance basis. MAC stands for "Message Authentication Code" and is a symmetric cryptographic transformation of data that protects the sender and recipient of the data against forgery by third parties.

The smart card issuer may decide whether security domain 310 utilizes a static key or a session key for transactions. A static key is a cryptographic key which exists prior to processing APDUs and which exists during and after the processing of APDUs. A session key is a cryptographic key which can be generated for a particular transaction and is typically no longer used for APDU processing after the transaction. If a session key is utilized, security domain 310 preferably derives its own session key for processing APDUs.

The APDU interface implemented by security domains consists of the initialization and personalization command set. These commands are intended to load security domains, to allow the initial loading of keys and to support key rotation. The general sequence of APDUs to establish one security domain is: 1. SELECT (Card Domain); 2. Perform authorization; 3. INSTALL (SecurityDomain); 4. Multiple LOAD (applet—executable); 5. INSTALL (install—and—register); 6. SELECT (SecurityDomainID); 7. PUT—KEY (SD encryption key encrypted with Card Domain initialization key); 8. Optional PUT—KEY (SD signature key encrypted with SD encryption key).

JAVA EMBODIMENT

One embodiment of the present invention makes use of the JAVA Card standard. The foundation of the card architecture is the JAVA Card virtual machine. The virtual machine executes byte code and manages class and objects. It also enforces separation between applications and enables secure data sharing. Above the virtual machine is the JAVA Card 2.0 API which provides a high level framework for writing applets for JAVA Card based platforms. These classes provide a high level language interface to the underlying functionality required by card applets which include the APDU buffer, commit/role back functionality, data sharing, and life cycle state. The classes are implemented in a mix of JAVA and native methods (i.e., assembly language) enabling applets to be implemented in pure JAVA without using native methods. This distinction enables easier verification of applet behavior and enforcement of security. It also means that the primitive functionality that applets require is contained in this API. In this embodiment, open platform API 306 provides base classes for the development of applets, security domains, and the card domain. OP API 306 describes additional packages for supporting the OP environment on a JAVA card. These packages provide the foundation for implementing the Card Domain applet and Security Domain applets.

Also included in this embodiment is a Card Executive which is responsible for dispatching APDUs to the current applet and selection of the current applets. The Card Executive selects an applet to become the current applet when a SELECT APDU is received. The Card Executive dispatches a non SELECT APDU by calling the current applets process method.

When receiving a SELECT APDU a Card Executive acts as follows. If the application identifier in the SELECT APDU belongs to a selectable applet (i.e., an applet in the personalized STATE) the Card Executive makes that applet the current applet which will receive subsequent APDUs. The Card Executive calls the applets select method. Notice that this method enables the current applet to handle SELECT APDUs as long as the application identifier in the APDU is not for another selectable applet.

The Card Domain is a special system applet representing the card issuer. It provides platform wide (or "card global") services. The Card Domain processes APDUs for the following functions: installing applets on the card; personalizing and reading card global data, such as card serial number; managing the card life cycle state including providing a card blocking service (the issuer is responsible for determining which applets, if any, can user the card blocking service); performing auditing for the card, when the card is blocked these are the only APDUs that will be handled; maintaining a mapping of security domains to applets; and acts as the security domain for the issuer's applets.

A Security Domain is a special applet owned by an applet provider to control the installing of the provider's applets. It manages signing and decrypting keys and provides cryptographic services using those keys. A Security Domain processes APDUs for the following functions: key set load; key update; and key set switch. During secure install of an applet, the Security Domain provides services to the card domain to decrypt an applet install file and check the signature on an applet file. For an applet associated with a Security Domain, the Security Domain provides decrypt and MAC functions on the Update Key APDU during the personalization phase of the newly installed applet. This is done exactly once: thereafter the applet can use the updated key to decrypt and check the MAC on the subsequent Key Updates. A Security Domain derives it's own session key for processing APDUs.

The virtual machine and Card Executive must be functional before any applet can be selected. As part of card initialization the Card Domain applet is installled and registered. It can then be selected and personalized (e.g. with card global data and it's own keys). After that it can be selected and used to install other applets. Card initialization includes the following steps: the Card Domain is installed and registered during the bootstrapping process of the first time boot of the Card Executive; the Card Domain is selected and the Security Domains from ROM are installed using the INIT key of the Card Domain; select each Security Domain and update their keys using INIT key of the Card Domain; select the Card Domain and load any card personalization data; and select the Card Domain and install applets, some or all of which may be in ROM.

The card security architecture allows for multiple applet owners to exist on card via the use of Security Domains. A Security Domain is a logical construct that represents the aggregation of applets that are owned by a common entity or owner. That common owner is represented on the card by the existence of a cryptographic relationship that has been securely loaded into the card and is supported by the Card Domain. A Security Domain establishes and maintains a chain of trust to a card, via this cryptographic relationship, for an applet owner. There may be multiple, Security Domains on a card with each represented by a unique cryptographic relationship.

The purpose of a Security Domain is to enable the post issuance loading of applets and confidential applet data using the cryptographic keys associated with that Security Domain. Note that the use of secure messaging during the post issuance load process is independent of the cryptographic functionality of the Security Domains. This cryptographic relationship includes the association of a cryptographic key with its owner and identifies specific applets or a range of applets that are controlled by the owner. The existence of this cryptographic relationship allows more than one applet owner to be represented on the card. Each owner, based upon their control of their cryptographic relationship is thus responsible for the security and integrity o f all applets within their Security Domain.

POST-ISSUANCE LOADING

Figure 4:
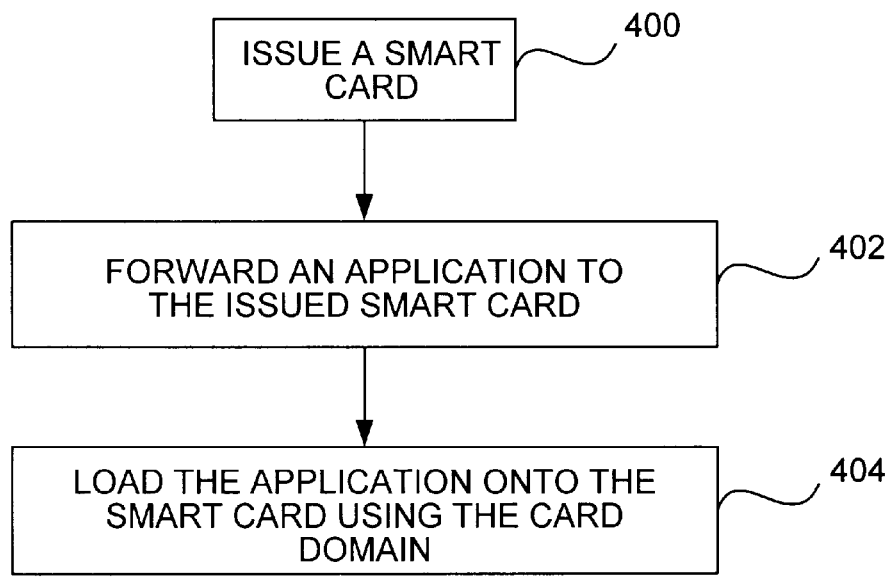
FIG. 4 is a flow diagram of an example of a method according to an embodiment of the present invention for installing an application onto an issued smart card utilizing a card domain.

FIG. 4 is a flow diagram of a method accordingly to an embodiment of the present invention for providing an application to a smart card. The example illustrated in FIG. 4 also applies to installing a security domain 310 onto a smart card. Note that all of the flow diagrams in this application are merely examples. Accordingly, the illustrated steps of this and any other flow diagram , can occur in various orders and in varying manners in order to accomplish virtually the same goal.

A smart card is issued (step 400), and an application is forwarded to the issued smart card (step 402). The forwarding of the application can occur through any electronic media which can interface with a smart card and connect to an appropriate network. For example, devices such as an automatic teller machine (ATM), a display phone, or a home computer, can be used to forward an application to the issued smart card. The forwarded application is then loaded onto the smart card, and the loading of the application is managed by card domain 308 (step 404).

Figure 5:
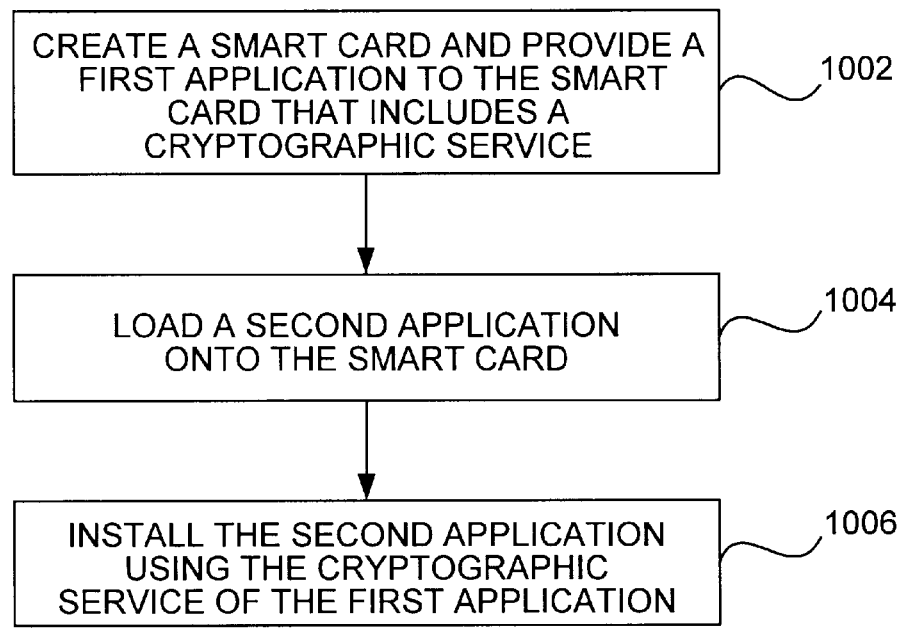
FIG. 5 is a flow diagram of a method according to an embodiment of the present invention for providing confidential information to an application in a smart card using security domains.

FIG. 5 is another flow diagram of a method according to an embodiment of the present invention for providing an application onto an issued smart card. A smart card is created and provided with a first application, the first application including a cryptographic service (step 1002). A second application is loaded onto the smart card (step 1004). Thereafter, the second application is installed, and the cryptographic service of the first application is utilized to install the second application (step 1006).

Figure 6:
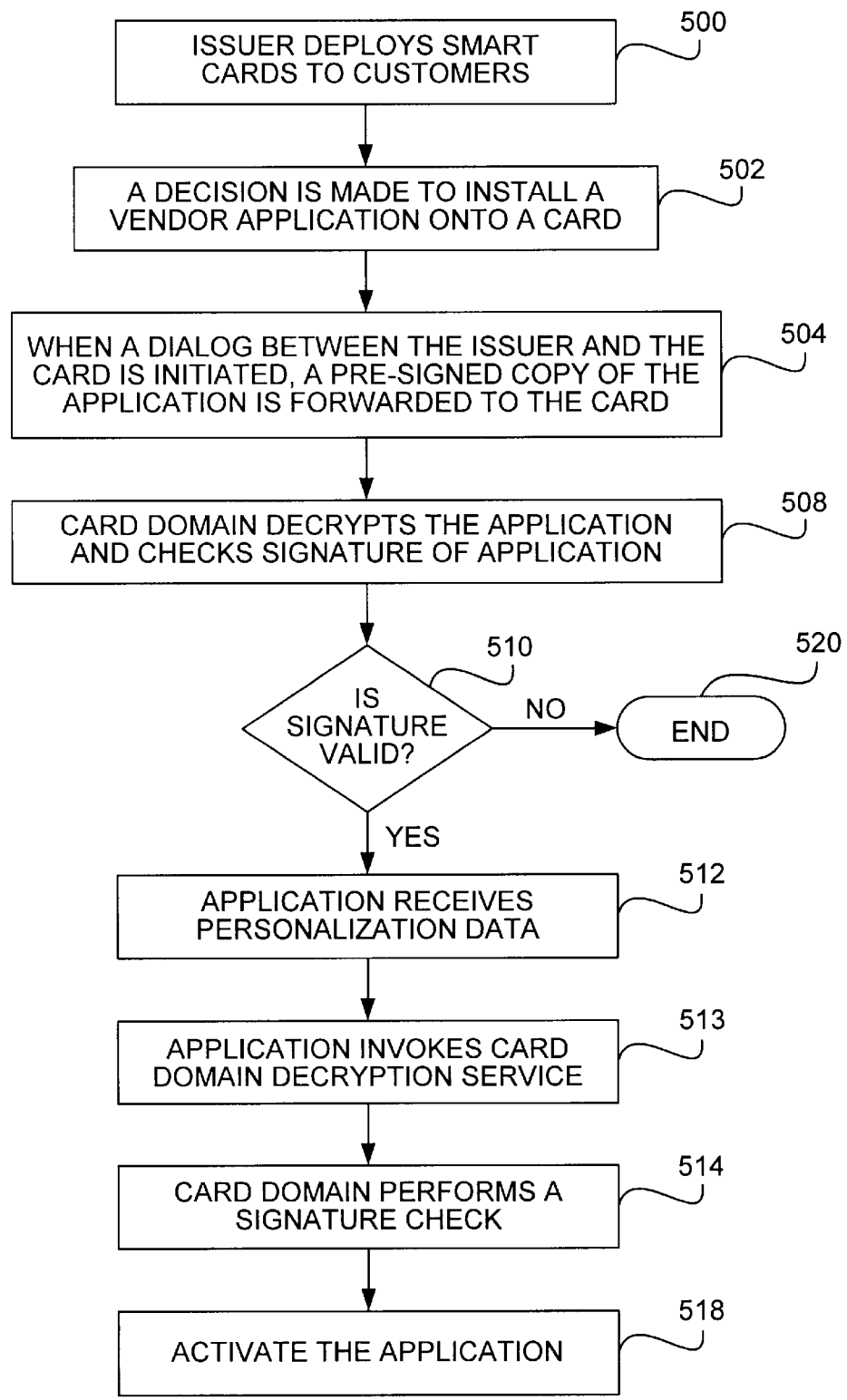
FIG. 6 is a flow diagram of an example of a method according to an embodiment of the present invention for installing an application onto an issued smart card utilizing a card domain.

FIG. 6 is another flow diagram of an example of a method according to an embodiment of the present invention for providing an application onto an issued smart card. This method for providing an application also applies to providing a security domain 310 onto the smart card. In the example shown in FIG. 6, a card issuer deploys smart cards to customers (step 500). A decision is made to install a vendor's application onto the issued smart card (step 502). When a dialogue between the issuer and the smart card is initiated, a pre-signed copy of the application is forwarded to the smart card (step 504). As previously stated, the dialogue between the issuer and the smart card can occur via any electronic device which can interface with a smart card and connect to an appropriate network. The application can be pre-signed with a key equivalent to that which already exists on the card so that each application has a unique signature that can be verified by the card.

Card domain 308 can then take the steps to load the application. Card domain 308 decrypts the forwarded application and checks the signature of the application (step 508). Card domain 308 can decrypt the application with the issuer's secret key. An appropriate cryptography method, such as Data Encryption Standard (DES) or 3DES, can be utilized to decrypt at least a portion of the application. Those skilled in the art will recognize that a number of cryptographic techniques may be used to implement embodiments of the present invention. For the purpose of illustration, symmetric key techniques are addressed herein, although asymmetric techniques are also contemplated. A good general cryptography reference is Schneier, Applied Cryptography, 2d Ed. (John Wiley, 1996), the contents of which are incorporated herein by reference.

It is then determined whether the signature on the application is valid (step 510). If the signature associated with the application is not valid, then the application is not loaded onto the card and the process ends (step 520). If, however, the signature associated with the application is valid the application is then installed and available for personalization. During personalization the application receives personalization data (step 512). Personalization data includes data which is unique to the smart card user. For instance, in a airline loyalty application, personalization data can include the smart card user's seating preference, meal preference, and eligibility for various possible perquisites. This personalization data can also be signed and encrypted.

During personalization, cardholder and card-specific data are placed on the card. This data is unique to the card and unique to the individual applets. Because only applets can be personalized, the traditional term "card personalized" is no longer appropriate for Open Platform cards. Applet personalization is performed under the complete control of each applet. It is the responsibility of each applet to provide proper auditing information regarding applet life cycle state to the Card Domain including informing the Card Domain once personalization is complete.

Every applet is personalized separately. Personalization data is always owned by a specific applet. Personalization of an applet can begin once the applet has been registered. Each applet receives APDU-level commands for personalization. These commands can be Update commands which the applet uses to populate its field structures with the appropriate data.

Each applet is responsible for determining when applet personalization is complete so that the applet state can be set to "personalized." Applets implement the APDU commands Set Status to finalize personalization and share the information appropriately with the Card Domain to allow auditing.

The following list illustrates the sequence of APDU commands that is used when a personalization key is involved. Personalization of an applet is started by selecting it with the Select command. Initialize Update is executed to allow the applet to respond with the relevant derivation data that has been loaded during initialization. The session key is calculated based on the current personalization key. External Authenticate is then issued to establish the appropriate level of trust. The personalization key that is initially used by an applet may have been put on the card during initialization. This personalization key may then be replaced with the "real" personalization key via the Put Key command. The new key data is encrypted using the current session key.

Initiate is again issued resulting in a new session key calculated based on the unique personalization key just loaded previously. A new session key has been established and it is used for all following personalization commands. The final step of personalizing is the APDU command Set Status.

The application then invokes card domain's 308 decryption service for the received personalization data (step 513). Card domain 308 can then performs a signature check for the received personalization data (step 514). Methods of decrypting personalization data and performing signature checks are well known in the art. Finally, the application can then be activated (step 518).

A new application which as been downloaded onto a smart card post-issuance can be stored in a variety of ways. One example is to store the application into a file. Another example is to maintain a pointer to the application object.

CARD AND APPLET LIFE CYCLE

The life cycle of a card and/or applet is defined as the time the integrated circuit and/or applet is first defined, to the time that the card is disposed of, or the applet is deleted by the cardholder or card issuer. Throughout this life cycle, the Open Platform card and its applets will transition through a number of pre-defined states. Each state that is reached will enable the card and/or applet to perform a fixed number of tasks. The Open Platform card provides a multi-applet architecture for chip cards and as such must take into account the life cycle of the card as a whole, and the life cycle of each applet contained within the card. The Card Domain is the entity on a card that is responsible for the card life cycle state management.

Figure 7A:
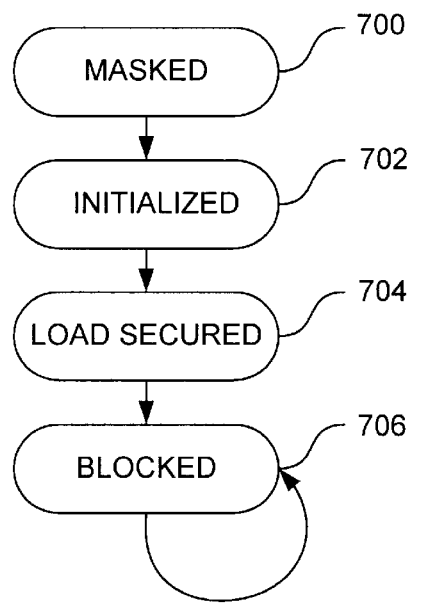
FIG. 7A is a flow diagram illustrating a sequence of card life states.

FIG. 7A is a flow diagram illustrating an example of card life cycle. The sequence is preferably considered irreversible. The first card state is when the smart card is Masked (700). During the Masked state (700), the smart card obtains, its operating system, card identification, and preferably at least one application. The Masked state (700) is achieved as soon as all of the necessary components for card initialization are made available. An example of when necessary components are made available is when card domain 308 and OP API 306 are enabled, as well as the Java card environment being enabled, such as a Java card virtual machine and a Java card API. During masking, the operating system, virtual machine, class libraries and optionally, applets are written into the non-mutable memory of a chip.

After the Masked state, the next state is the Initialized (702) state. The Initialized state is achieved once all card activity requiring an initialization key is complete. As part of card initialization, if not already available, the card domain 308 application must be installed and registered. In addition, one or more security domains may also be installed and registered. These installed domains must then be selected and personalized. An initialization key is a secret key which is typically used by a smart card manufacturer during loading of data onto the smart card prior to issuance.

The next state is Load Secured (704). The Load Secured state is achieved after a secure install (post-issuance download) mechanism for loading of applications through the remainder of the card lifetime has been established.

The final card state is when the card is either expired or blocked (706). The blocked state is achieved as soon as an authorized smart card application has received a command to block the card.

The card life cycle is preferably an irreversible sequence of states with increasing security. Initialized and all subsequent card life cycle states and their transitions are preferably under the control of card domain 308. Card domain 308 executes and responds to commands that result in a transition in the card life cycle from one state to the next. These commands are preferably Application Protocol Data Unit (APDU) commands. Card domain 308 is also responsible for the installation of applications on the card, but preferably has no control over the applications' life cycle states. Each application is preferably responsible for its own application life cycle state management but it preferably allows card domain 308 to have access to its life cycle states for auditing purposes.

The card life cycle is designed in such a way to increase the level of security enforced by the card at each successive state. As stated above, the cycle is also established as a process which can only ratchet forward to ensure that once the card begins a life cycle state with associated security policies, the only option is to cycle forward to the next state in the life cycle with a higher level of security. The card domain as the system security manager of the card maintains the current life, cycle state, enforces the associated security policies, and controls the state transitions in the card life cycle.

Figure 7B:
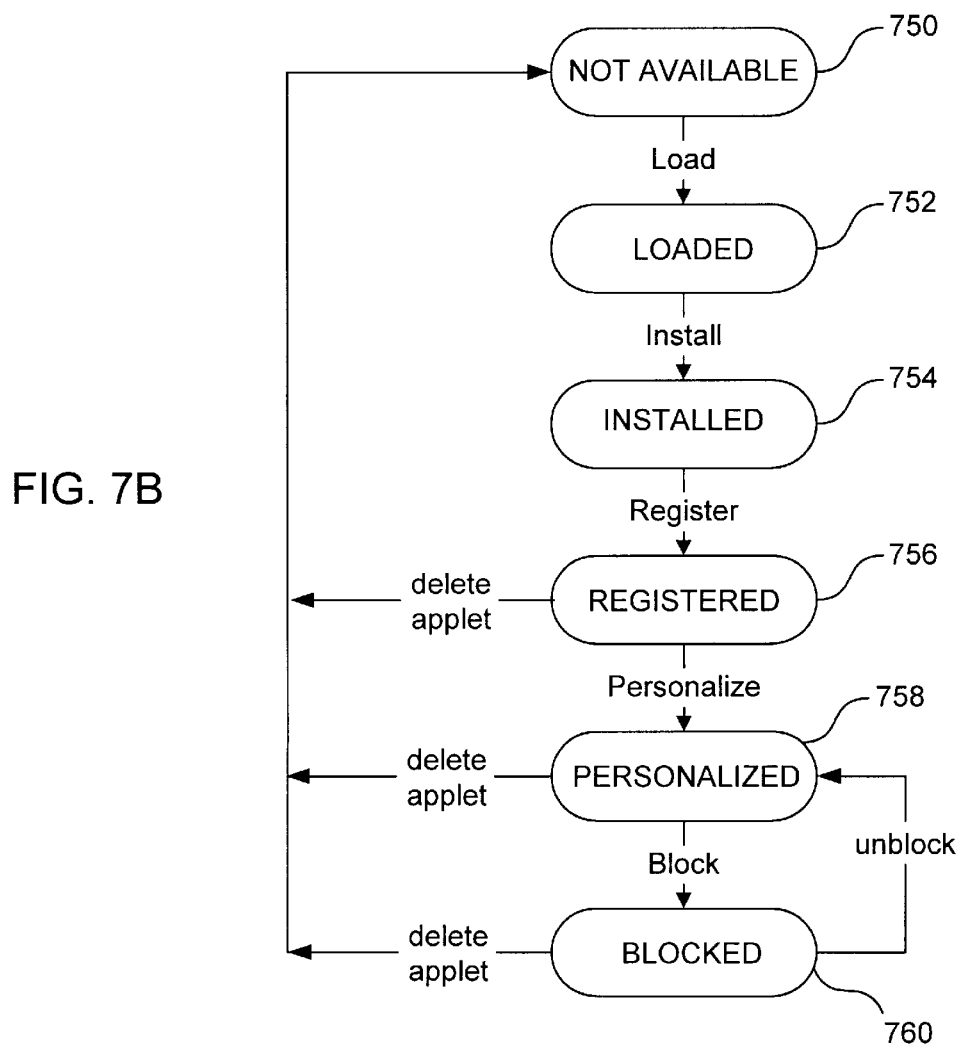
FIG. 7B is a flow diagram illustrating a sequence of card life states.

FIG. 7B is a flow diagram illustrating an example of an application life cycle. The application is initially unavailable (750). This state is achieved as soon as an applet is deleted and/or blocked from access. The next state is a loaded state (752). The application reaches the loaded state once the application has been physically loaded onto the smart card. The application is then installed (754), and registered (756). The installed state is achieved as soon as an applet has allocated all of the necessary space and data structures for operation. The registered state is achieved as soon as an applet has been included in the registry of applets. Once the application is registered, it can be deleted at any time thereafter. The next state is the personalized state, wherein personalized information is included in the application (758). The personalized state is achieved as soon as an applet has been updated with card holder specific data. Finally, the application may expire or be blocked (760). The blocked state is achieved as soon as the applet makes a distinctive call to block itself from further access. The card domain takes responsibility for loading, installing, registering and deleting applets. The applet itself is responsible for handling of the applet life cycle states "personalized" and "blocked." An applet is not required to transition through all states during its life. For example, an applet may be present on the card but remain dormant throughout the card lifetime because its install method is never called. The Card Domain takes responsibility for and controls the loading, installation and registration process of an applet until the applet is selectable. The Card Domain keeps track of the process and can report on its status. The Card Domain does not control the applet life cycle states "personalized" and "blocked", because these applet life cycle states are under the complete authority of the applet only. However, the Card Domain does have access to applet life cycle data for auditing purposes.

The life cycle of the card and its applets are determined by the contents of the card memory. The smart card contains three types of memory: persistent, non-mutable memory; persistent mutable memory; and non-persistent mutable memory. Although there are several different types of memory technologies currently available for each of the memory types, ROM, EEPROM and RAM are the most widely used for these respective types. This section uses these abbreviations when referring to the memory types, but does not imply or mandate the use of a certain physical memory technology.

The contents of the ROM are defined first. The ROM contains the card operating system and may also contain applet code. More applets may be added during the life of the card, either during the initialization and the personalization phase, or during the post issuance phase. Loading an applet after the card has been issued is referred to as "Secure Install". The contents of the EEPROM are determined by a memory loading process that occurs after chip fabrication. Therefore, the contents of the EEPROM memory, card life cycle and applet life cycle are closely related because of the dynamics involved. The contents of EEPROM memory are modified during initialization, personalization and Secure Install. Although EEPROM memory contents and card state are closely related, there is nothing in the architecture that ensures that the two are synchronized.

Figure 8:
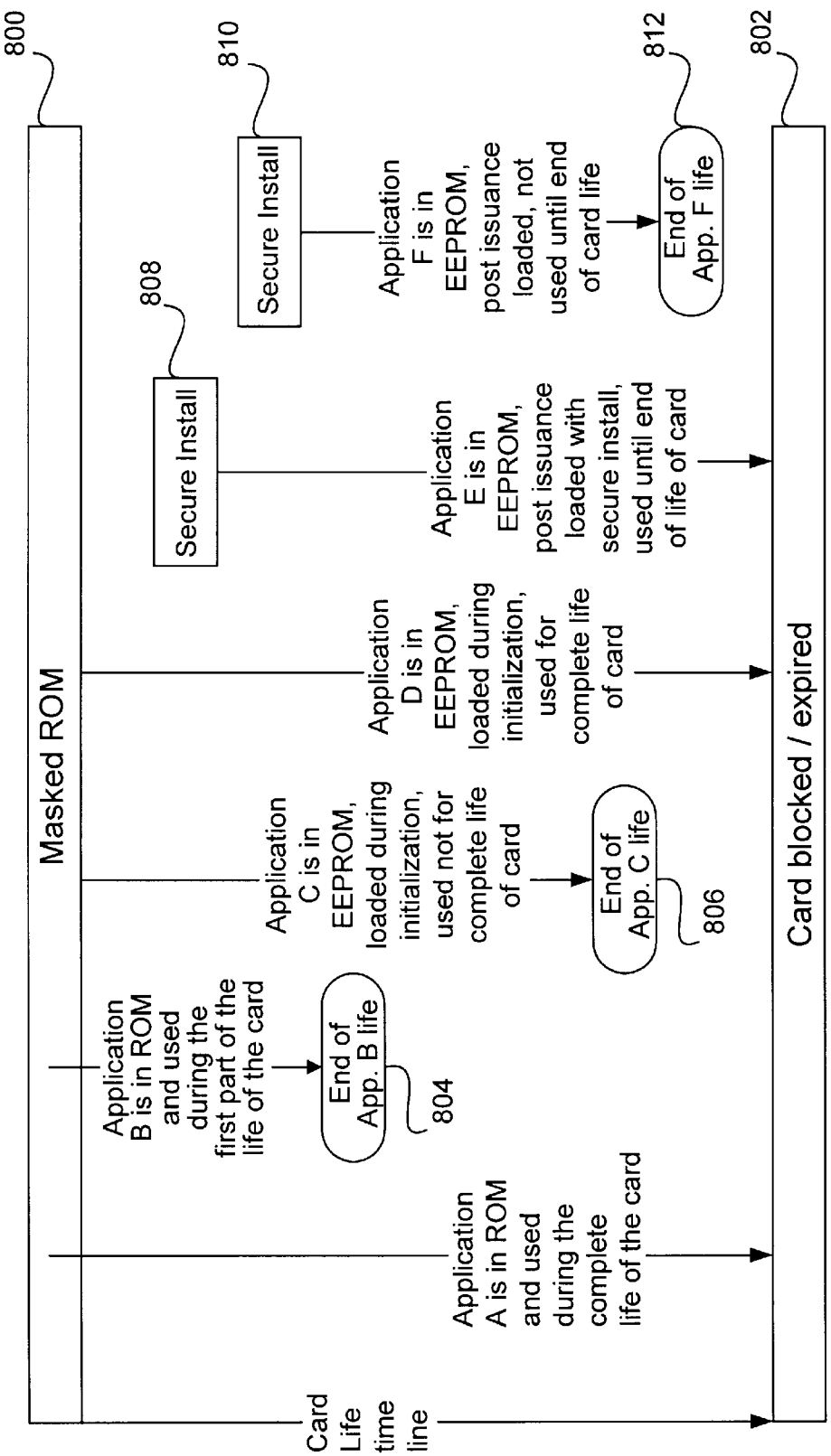
FIG. 8 is an illustration of an example of a card life cycle.

FIG. 8 is an illustration of an example of multi-application card life time line. The illustration does not include any off-card activities that occur prior to masking, initialization, personalization, Secure Install, nor activities that may be related to card management procedures. The illustration shows a card that contains six applications (A through F) over its lifetime.

This time line starts with a Masked ROM stage 800 and ends with a card blocked/expired stage 802. At Masked ROM stage 800, applications A, B, C and D are shown to be installed. This example shows applications A and B being installed at a masking stage of the card, applications C and D being installed at initialization stage, and applications E and F being installed post issuance.

In this example, application A can be installed in ROM and used during the complete life of the card from Masked ROM stage 800 to card blocked/expired stage 802. Application B is also in ROM and utilized during a first portion of the life of the smart card. The life of application B ends at stage 804. Application C is located in non-volatile memory, such as EEPROM, which is loaded during initialization. Application C is shown to expire at stage 806. Application D is also located in EEPROM and is used for the complete life of the card until card blocked/expired stage 802. Application E is installed at stage 808, sometime after issuance of the smart card. Application E is located in EEPROM and used until the end of the card life at card blocked/expired stage 802. Application F is also installed post issuance at stage 810, and expires sometime before the end of the card life at stage 812.

Figure 9:
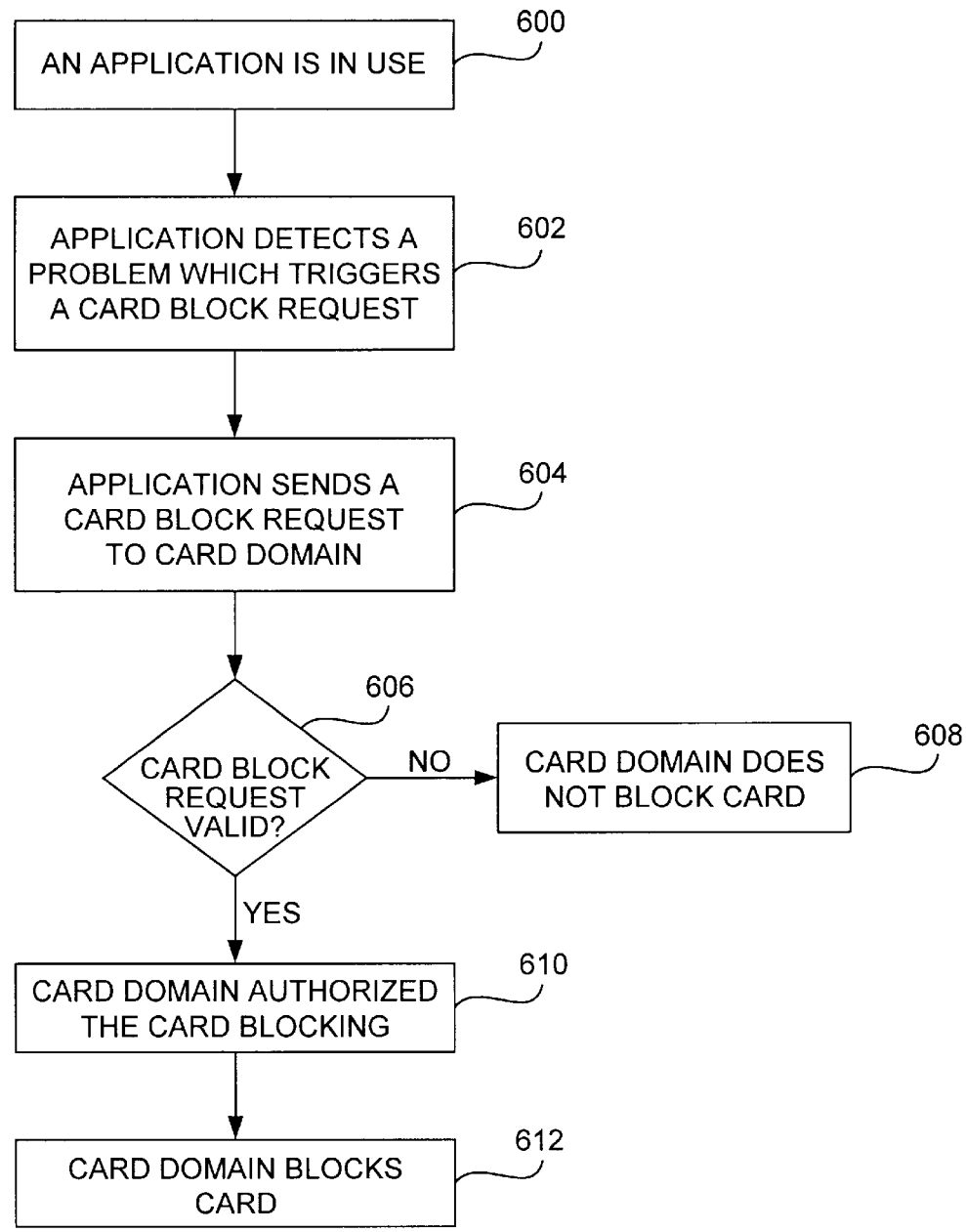
FIG. 9 is a flow diagram of an example of a method according to an embodiment of the present invention for blocking a card utilizing a card domain.

FIG. 9 is a flow diagram of a method according to an embodiment of the present invention for blocking a card. A card be can be blocked if a breach of security is detected by an application. According to an embodiment of the present invention, a smart card can be blocked while an application is in use. A blocked card will no longer operate so that a suspect user cannot utilize any of the applications on the smart card. Blocking is merely one example of the many functions card domain 308 can perform in managing the other applications on the smart card. Examples of other functions include installing an application on the smart card, installing security domains 310A–310B, personalization and reading of card global data, managing card life cycle states including card blocking, performing auditing of a blocked card, maintaining a mapping of card applications to security domains, and performing security domain functions for applications which are not associated with a security domain.

In the example shown in FIG. 9, an application is currently in use (step 600). The application detects a problem which triggers a card block request from the application (step 602). The application then sends a card block request to card domain 308 (step 604). Card domain 308 determines whether the card block request is valid (step 606). A card block request can be valid if the request originate from a predetermined application. If the card block request is not valid, the card domain 308 does not block the smart card (step 608). However, if the card block request is valid, then card domain 308 authorizes the card blocking (step 610), and card domain 308 blocks the smart card (step 612) such that the smart card will reject any attempted transactions for any of the applications on the card.

Card blocking may be implemented as blocking of the applet Card Domain. The Card Domain applet must implement the specific behavior of blocking the applet itself (Card Domain). It must also implement the card issuer specific requirements for blocked card behavior.

Figure 10:
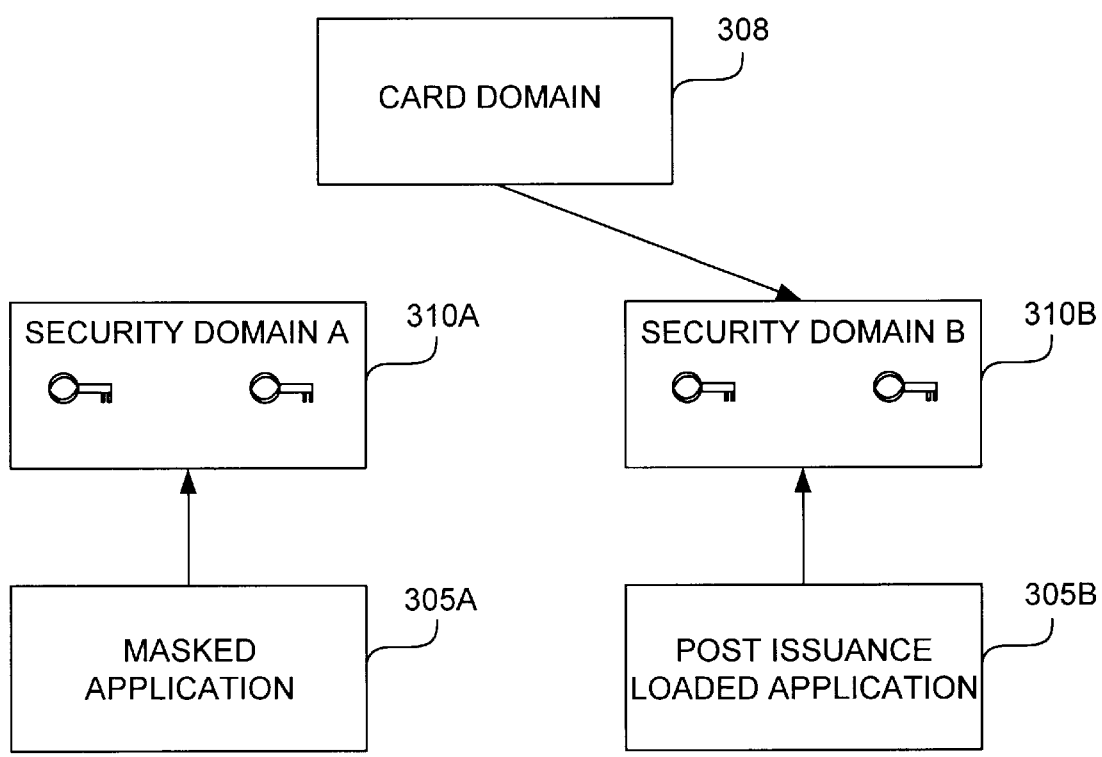
FIG. 10 is a block diagram illustrating interactions between a card domain and a security domain on a smart card according to an embodiment of the present invention.

FIG. 10 is a block diagram illustrating the use of security domain 310 by the card domain 308. The method and system according to an embodiment of the present invention allows for multiple application providers to be represented on a smart card in a secure and confidential manner. Th is security and confidentiality can be achieved through the use of security domains 310A–310B shown in FIG. 3.

A Security Domain in the context of the present invention architecture is a logical construct that is implemented as an applet to provide security related methods to the Card Domain and to applets belonging to the Security Domain. An applet provider interested in loading this application post issuance must be represented and identified by a Security Domain on the target card. There may be multiple Security Domains on a card, each represented by a unique cryptographic relationship. A Security Domain applet is responsible for the management and sharing of the keys and the associated cryptographic methods which make up the domains cryptographic relationship. An applet which is loaded to the card post issuance must be associated with only one Security Domain, however, multiple applets may be associated with the same Security Domain. Applets installed on a card during the pre issuance phase may optionally be associated with a Security Domain on the card for the purpose of loading confidential data to those applets using these Security Domain keys. Security Domain applets may be included in the mask or added in initialization or personalization. There are selectable applets which are protected from one another and the rest of the system via the standard applet security. Each Security Domain applet provides an APDU interface for communication off-card and an object sharing interface.

The APDU interface consists of personalization commands and is intended to allow the initial loading of Security Domain keys and to support key rotation if desired during the life of the Security Domain. The object interface is comprised of the signature verification method and the decryption methods which are shared with the Card Domain for post issuance loading of applets and with applets for decrypting application confidential data. Note that the card domain with its keys may always function as a Security Domain as well and does so as the default.

FIG. 10 illustrates an example of a smart card which contains two security domains 310A–310B. In this example, it is assumed that a masked application 305A from the smart card is associated with a security domain, such as security domain 310A, and an additional application 305B will be added post issuance and be associated with a second security domain, such as security domain 310B. The arrows indicate key relationships between the various smart card entities as will now be described. Masked application 305A uses key services from security domain 310A for decrypting confidential data and optionally for full personalization. Card domain 308 uses key services from security domain 3103B for decrypting and checking the signature of an application loaded post issuance, such as post issuance loaded application 305B. Post issuance loaded application 305B uses key services from security domain 310B for decrypting confidential data and optionally for full personalization.

Figure 11A:
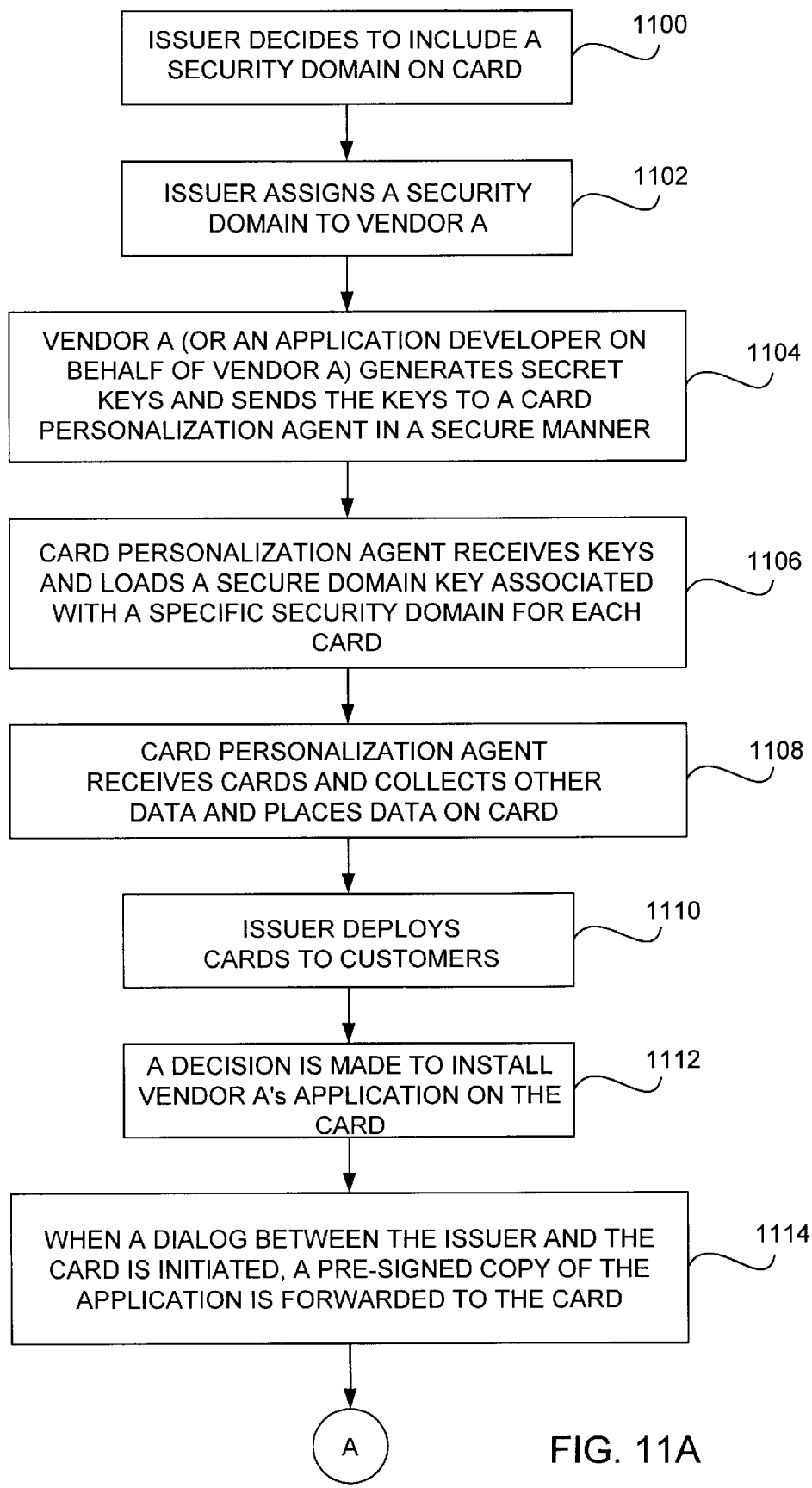
FIGS. 11A and 11B are flow diagrams of an example of a method according to an embodiment of the present invention for loading an application by using a security domain after the smart card has issued.
Figure 11B:
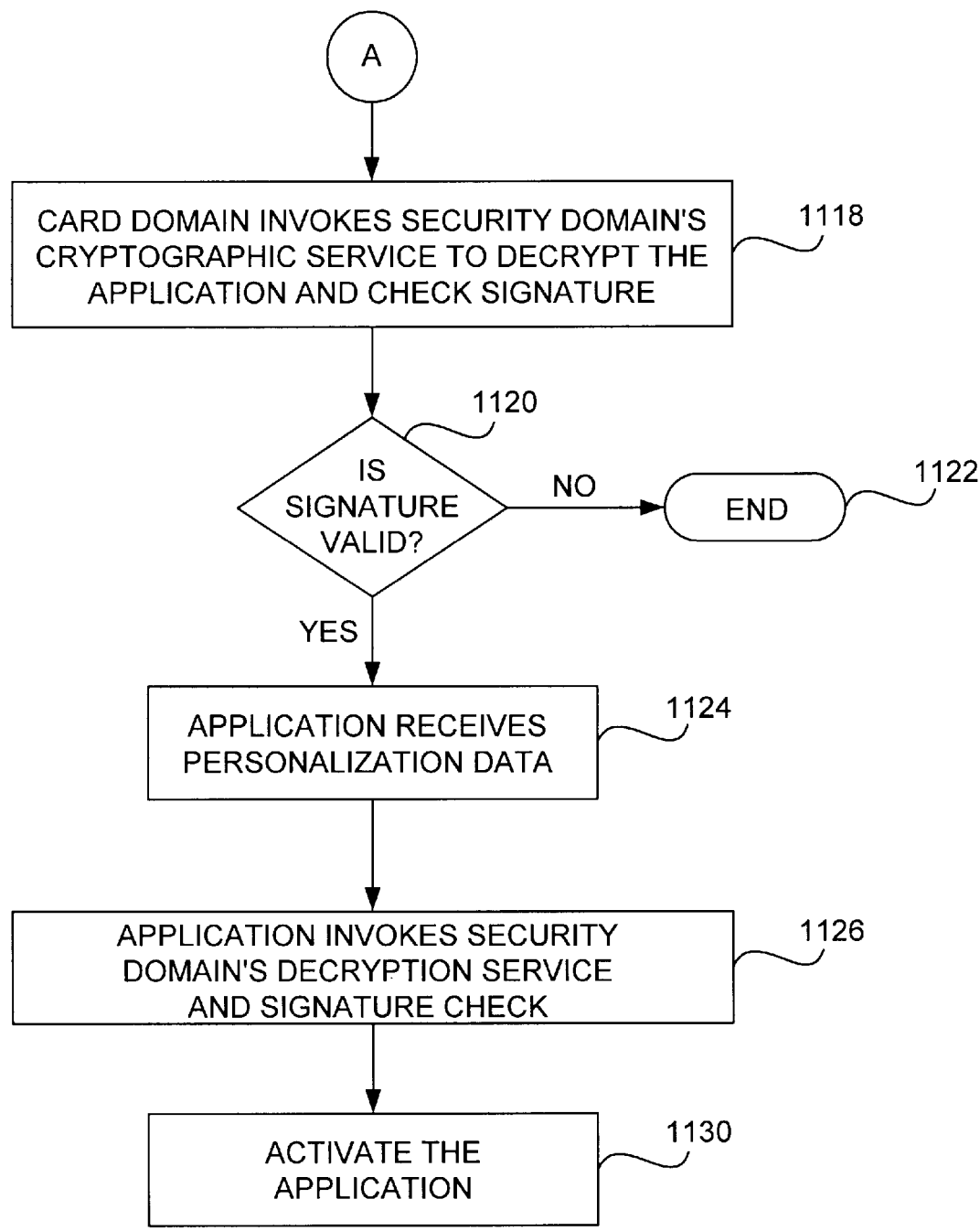

FIGS. 11A and 11B are further flow diagrams of an example for a method according to an embodiment of the present invention for providing an application onto an issued smart card. The card issuer decides to include a security domain 310 onto a smart card (step 1100). The issuer assigns security domain 310 to vendor A (step 1102). Vendor A, or an application developer on behalf of vendor A, generates cryptographic keys such as those used in symmetric or asymmetric cryptography operations (step 1104). Examples of these cryptography operations include encryption, decryption, MACing, hashing, and digital signatures. Examples of cryptographic methods which utilize such keys and are suitable for implementation for the embodiment of the method and system of the present invention include Data Encryption Standard (DES) and 3DES. The card personalization agent receives the keys and loads security domain keys associated with a specific security domain 310 for each smart card (1106). The card personalization agent receives smart cards and collects other data, OS, code, and application and card holder specific data, and places the data on the smart card (step 1108).

The card issuer then deploys the smart card to customers (step 1110). A decision is then made to install vendor A's application on the smart card (step 1112). When a dialogue between the smart card issuer and the smart card is initiated, a signed copy of the application is forwarded to the smart card (step 1114). The application can be signed with a key equivalent to that which already exists on the smart card so that each application has a unique signature that can be verified by the smart card.

The smart card's card domain 308 then takes steps to load the application. Card domain 308 invokes an associated security domain's cryptographic service to decrypt the application and check the signature (step 1118). It is then determined if the signature is valid (step 1120). If the signature is not valid, the process ends (step 1122). If, however, the signature is found to be valid, then the application receives personalization data which can be signed and optionally encrypted (step 1124). The loaded application then invokes its associated security domain's decryption service and signature check for the received personalization data (step 1126). Secret keys required to run or operate the application on the smart card are used to activate the application by authentication (step 1130).

Figure 12A:
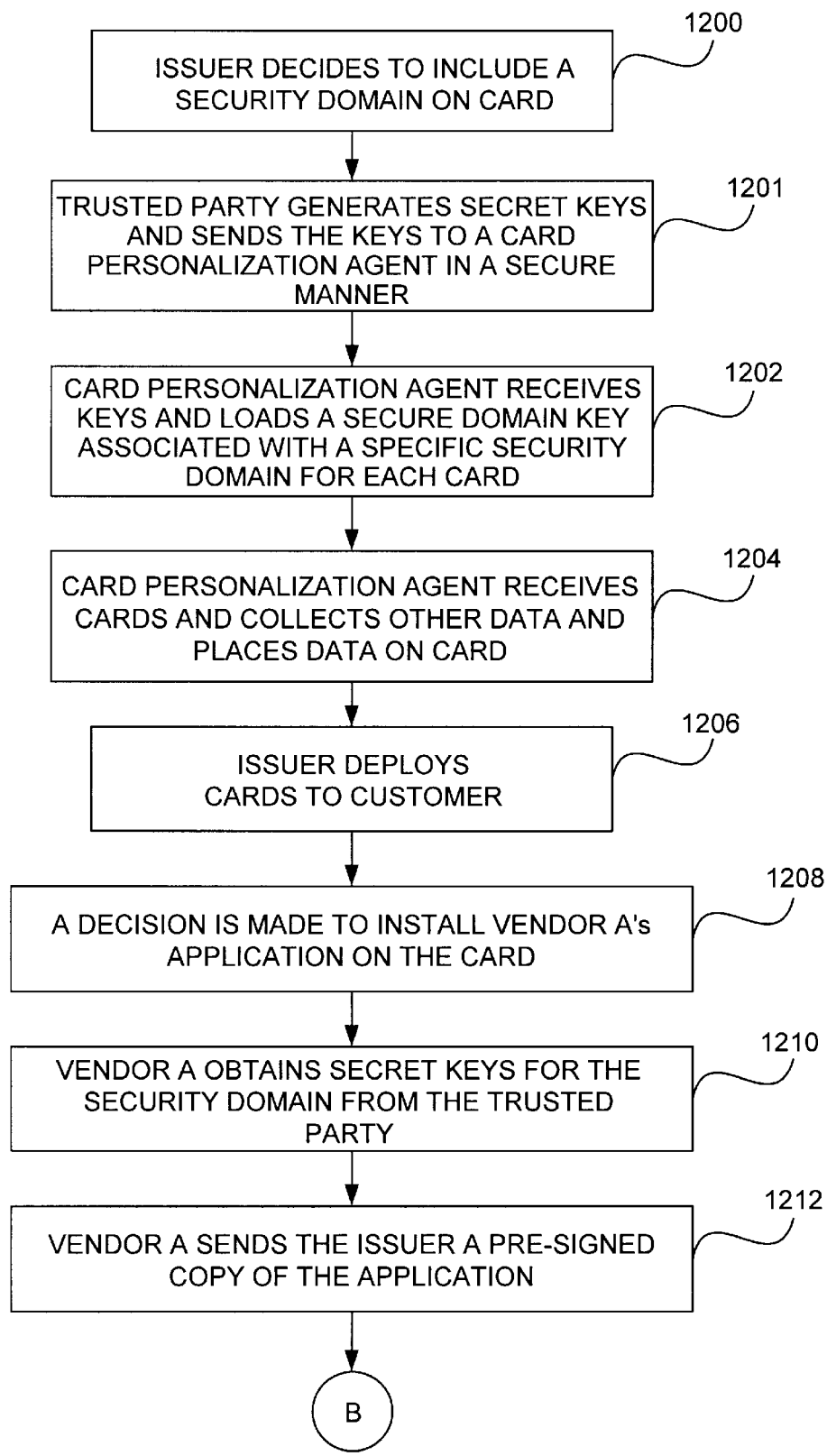
FIGS. 12A–12B are flow diagrams of an example of a method according to an alternate embodiment of the present invention for loading an application using a security domain after the smart card has issued.
Figure 12B:
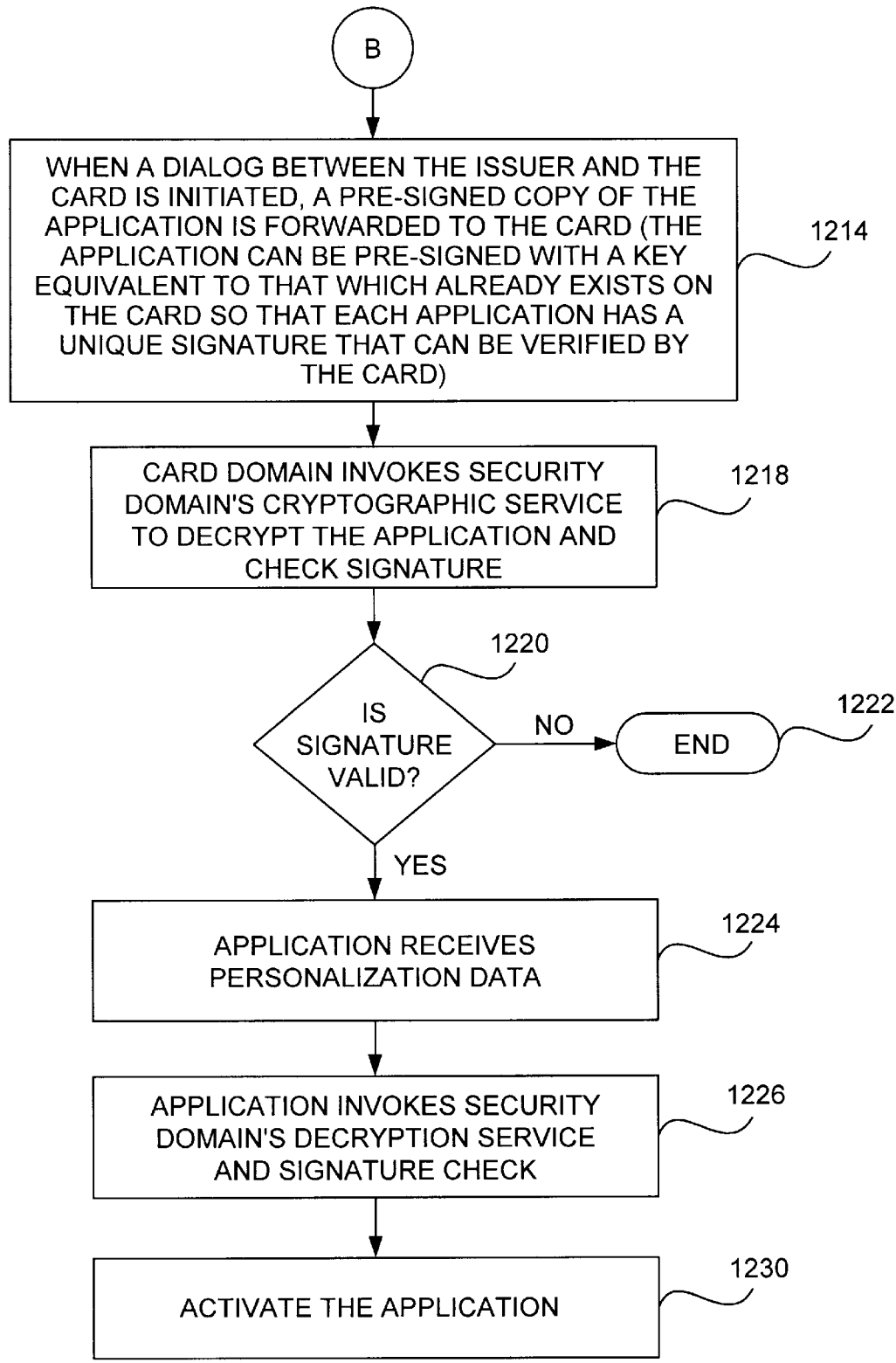

FIGS. 12A and 12B are flow diagrams of a method according to another embodiment of the present invention for providing confidential information to an application using a security domain 310. The issuer decides to include a security domain 310 on a smart card (step 1200). A trusted party generates secret cryptographic keys and sends the keys to a card personalization agent in a secure manner (step 1201). A trusted party is typically a third party who performs the function of certifying the source of information, such as a signature. A card personalization agent (which may be the same as the trusted party) receives the key and loads a unique secure domain key associated with a specific security domain 310 for each smart card (step 1202).

The card personalization agent receives the smart card and collects other data, such as OS, code, and application and card holder specific data, and places the data on the smart card (step 1204). The issuer then deploys the smart card to its customers (step 1206). A decision is made to install vendor A's application on the issued smart card (step 1208). Vendor A obtains secret keys for security domain 310 from the trusted party (step 1210). Vendor A then sends the smart card issuer a signed copy of Vendor A's application (step 1212).

When a dialogue between the smart card issuer and the smart card is initiated, a signed copy of the application is forwarded to the smart card (step 1214). The application can be signed with a key equivalent to that which already exists on the smart card so that each application has a unique signature that can be verified by the smart card. Card domain 308 invokes security domain's cryptographic service to decrypt the associated application and check its signature (step 1218). It is then determined whether the signature is valid (step 1220). If the signature is not valid, then the process ends (step 1222).

If, however, the signature is valid, then the application receives personalization data, which can be signed and optionally encrypted (step 1224). The loaded application then invokes security domain's decryption service and signature check for the received personalization data (step 1226). The cryptographic secret data required to run or operate the application on the card are used to activate the application (step 1230).

SECURE INSTALL PROCESS EMBODIMENT

The primary object of the Secure Install Process is to load an applet and/or other objects from an applet server via a card acceptance device and its supporting system infrastructure delivery mechanism, on to a card post issuance in a secure and confidential manner. This process begins once the card issuer has converted the applet into the appropriate install format for download.

The applet provider can choose to sign and encrypt the applet Install File. The following description assumes both encryption and signing to be required. First the Install File must be padded to an eight byte boundary. After padding has been done, the Install File is encrypted using the applet provided encryption key. This key is available in the corresponding Card Security Domain and will be used during the Secure Install process to decrypt the loaded applet. Additionally, the applet provider may choose to sign the applet. The applet is signed by calculating the signature over the complete Install File. If the Install File has been encrypted, the signature is calculated using the encrypted file. If the Install File has been not been encrypted, padding is to be performed before calculating the signature. The signature is calculated using the applet provider Security Domain signature key. The Card Domain Secure Install process uses the Security Domain key services to verify the signature of an applet and to decrypt it. Note that neither encryption nor signing are mandatory steps in the process, but are policy decisions of the applet provider and the card issuer. During the Secure Install Process, the signature service of the corresponding Security Domain is used by the Card Domain to verify the signature of the encrypted Install File. Once verified, the Card Domain may then decrypt the Install File using the decryption service of the Security Domain applet. In order to determine the correct Security Domain, the Card Domain receives the application identifier of the applet to be loaded and its associated Security Domain at the beginning of the download process. The Card Domain performs a check to validate that the application identifier is authorized for the proposed Security Domain on the card.

The card issuer by virtue of the Card Domain provides the key services for the Secure Install APDU level transport layer. Since the Secure Install process relies upon the Card Domain key services to provide security and integrity at the transport level, it is the card issuer who is ultimately responsible for the transport layer. A card issuer may be decide upon the use of APDU encryption during Secure Install; however use of the secure messaging during Secure Install is mandatory.

The card issuer uses the Card Domain to provide integrity and confidentiality during Secure Install by means of DES based cryptographic methods. At the APDU level secure messaging is used to verify that all data of an APDU transmission has been received correctly and unmodified, and to insure the confidentiality of data. Secure messaging can be performed as described in the specification *Visa Integrated Circuit Card,Specification Version* 1.3.

The Card Domain Secure Install process offers full error recovery that is independent of the processing stage reached during a Secure Install section. Either the Secure Install succeeds completely or is not performed at all. In order to perform error recovery successfully, the Secure Install process requires the following functional support. If Secure Install is not completed successfully, the card operating system shall take responsibility to reestablish the original memory contents. The secure install protocol does not provide a mechanism for sporadic data transmission errors, e.g. single APDU repeat is not performed at the install protocol level.

A number of reasons could cause a failure in the Secure Install download process. These include the situations when: a single APDU MAC is not verified; an applet signature can not be verified; a memory allocation problem occurs; or a memory write problem occurs (physical memory error). Failure during Secure Install causes a complete abort of the process; therefore all downloaded information is completely erased from the card's memory.

As indicated previously, Secure Install is implemented within the Card Domain; however, prior to the actual Secure Install process, a number of steps prepare, an applet before download. This section will provide an overview of these steps. The following is a description of the off card tasks that are assumed to be performed within the applet development tool kit. Data entities that must be stored on the card are created such as: a process method; an install method; and applet data (file system and tag data). Steps required to create the install file image are the responsibility of the appropriate set of tools. The result of the download preparation process s the Install File.

The Install File will contain sufficient data about its own contents to allow the card operating system and/or Secure Install to successfully install the file contents. The Install File contents will include: the applet name (applet identifier); the applet's memory requirements; any applet cross-linking (fix up) information; and the applet executable code (process method and install method). All data objects (e.g. file system) to be used by an applet must be create d by the applets install method. The file system creation must therefore be coded the applet provider. Populating the file system with applet specific data and with card specific data is the responsibilty of the applet personalization process. For reasons of confidentiality the applet provider may choose to encrypt the Install File. For reasons of integrity the applet provider may also choose to sign the Install File. The signature is implemented as a symmetric key based signature and is verified using the applet provider's Security Domain signature service. This signature is calculated over the complete Install File.

The card acceptance device initiates the Secure Install process by first selecting the card's Card Domain using the APDU command Select. After selecting the Card Domain, authentication and the initialization of cryptographic functions must take place. Authentication means that the card responds with a cryptogram that allows the loader to verify the card identity. Initializing the cryptographic functions means that the smart card as well as the loader must calculate session keys. The APDU command used is the Initialized Update command. When this command is received, the Card Domain shall calculate the session keys for the APDU MAC verification and for the APDU data decryption. The Card Domain shall create a response consisting of a cryptogram for authentication purposes and key diversification data. Following this response, the Card Domain Secure Install process is now ready to receive the Install File on the card.

Successful completion of the previous command is a prerequisite for the Install File transmission. Transmitting (loading) the Install File is initiated by the APDU Install command. After successful completion of this command, the Install File Loading can be performed using the APDU Load Install File command.

For signature checking and Install File decryption the Card Domain will use the key services supplied by the corresponding Security Domain. Signature checking and Install File decryption is initiated using the Install command. After a successful verification of the applet signature and decryption of its executable, the Card Domain must now call the applet's install method; allocate memory for its data objects; configure data sharing for the applet; and register the applet with the Card Domain. As soon as the applet install method has completed successful, the applet is integrated into the card environment as follows. The applet application identifier is registered in the list of selectable applets and the card auditing information is updated. Registering an applet makes the applet selectable. Only a registered applet can receive APDU commands for processing. After integrating the applet into the card environment, the applet must be personalized. The data objects (e.g. file system) themselves have been created by the applet's install method. The process is identical to an applet personalization process.

The contents of the applet Install File are not only the applet itself, but also information required by the load process. Therefore the Install File contains: the actual applet class, the mandatory data required to perform the download; and the optional data to aid the download process and to improve its performance.

The applet Install File must contain all information that is required by the card in order to receive the applet, store it in non volatile storage and make it ready to run. This mandatory data includes the following: name or identifier of the applet; identification of hardware and software requirements (version of virtual machine, system class and system framework); link references to libraries and classes in ROM that need to be resolved; link references to libraries/class/ functions in non volatile that need to resolved; link references within the applet that need to be resolved; fix ups for data references that need to be resolved; entry points for "process" and "install" methods; and proof of ownership, origin, and completeness and correctness. Optional information includes memory requirements, debug information and any potential terminal related information.

The applet development process begins as soon as a concept of the desired applet is formulated. Once formulated, the concept must go through a number of stages before becoming a full fledged working and installable applet. An applet consists of two primary elements; the applet's process method; and the applet's install method. The applet development process (executable) is considered complete after creating and securely delivering the Install File. This development process may vary by organization but in general consists of the following steps: applet requirements gathering and definition; applet specification is developed from requirements; source code is developed from specification; managing applet source code, testing, approving; translate applet source code into card executable code; conversion to card byte code; card byte code verification; code linking and reference resolution; and signature creation.

The results of the translation process is the Install File. The Install File contains the card byte code that is to be executed by the card. The purpose of this file may be one or more of the following: input to the ROM image (masking); input to tho initialization procedure (pre issuance load); and distribution for post issuance load (Secure Install). The Install File format and its contents are target system independent. The result of an applet development process is a target system independent signed Install File that contains the complete information need for loading an applet onto a card. The applet executable is contained within a single Install File. This Install File can be used for any of the following: the masking process; the initialization process; or the Secure Install process.

CRYPTOGRAPH KEYS FOR POST ISSUANCE LOADING

Key management relies on a hierarchy of keys. Keys higher up in the hierarchy are used to securely load additional keys into the card. This means that the highest key in the hierarchy is an initial key. At the IC level there is a chip password and an initialization key. At the next level below, the Security Domain level, there are Security Domain keys. At the next application level there is an application personalization key and application transaction keys. Finally, down at the session level, there are applications session keys. Note that the Card Domain functions as the default Security Domain on the card, thus the Security Domain level noted above includes the card Domain keys. Security Domain keys may have a hierarchical relationship with the initialization key or with the card domain keys depending on the requirements of the Security Domain owner.

The initialization key is available when the card initialization procedure is authorized. It is used as an encryption key to confidentially load secrets, e.g. other keys, onto the card and is initially owned by the Card Domain. The initialization key is used for the encryption of APDU data during initialization and the decryption of Security Domain and encryption keys. A Security Domain and encryption key is a special dedicated version of an encryption key. Each Security Domain has an encryption key and a signature key. The encryption key is used to decrypt the Install File during post issuance applet loading and to decrypt the applet personalization key.

The Security Domain signature key is a special dedicated version of a MAC key. Each Security Domain has a signature key and in one implementation the signature is represented by a MAC. The MAC key is used to verify the Install File signature during post issuance applet loading. The application personalization key is used during applet personalization and is owned by the applet. The key is used to load card and or applet specific data (which can also be keys) into the applet. An application encryption key is used to encrypt and decrypt data, for example, it can be used to encrypt APDU data. Encryption keys are owned by applets and have applet specific uses. Encryption keys are used to decrypt APDU command data and to encrypt APDU response data. An application MAC key is used to create or to verify a MAC. The keys are owned by applets.

In order to load keys of a specific Security Domain applet, the Security Domain applet has to be selected. The Security Domain encryption key may be encrypted with the Card Domain initialization key or optionally with the Card Domain encryption key if initialization had ended. The Security Domain encryption key is used to encrypt the Security Domain signature key. Security Domain signatures must be loaded encrypted using the encryption key of the corresponding security domain. It is not required to perform this function during initialization, it is only required to be performed before any Secure Install. The above completes the loading of keys into one or more Security Domains. The Security Domain encryption key service is shared to corresponding applets for decryption of confidential applet data. The key services of the Security Domains are also shared with the Card Domain for Secure Install. In order to load confidential data (including keys), an applet can use decryption services of it's corresponding Security Domain. The Card Domain acts as the default Security Domain.

Figure 13:
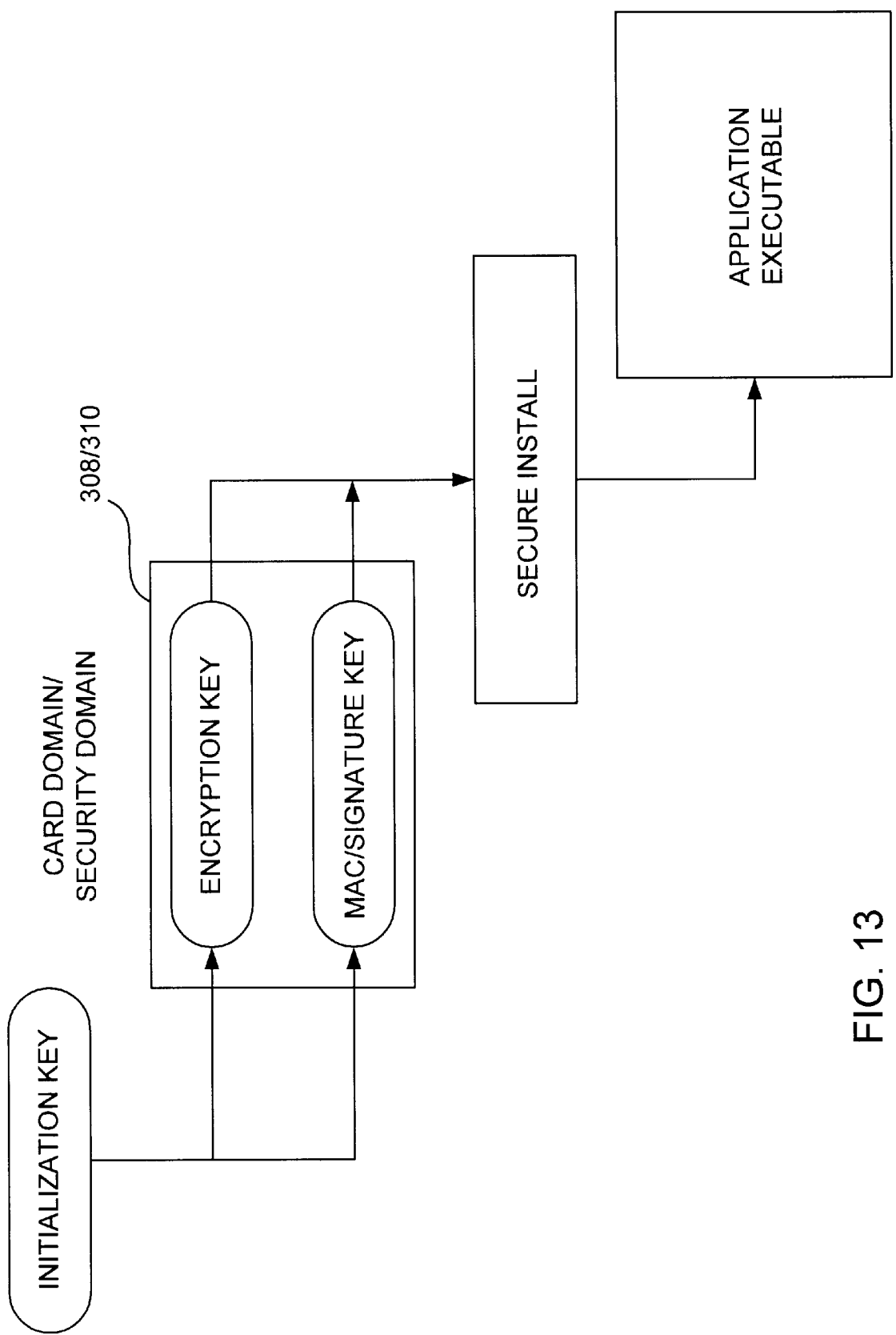
FIG. 13 is a block diagram illustrating an example of key management and key dependencies for post issuance download of applications onto the smart card.

FIG. 13 is a block diagram illustrating the use of cryptographic keys for post issuance loading of an application onto a smart card. Applications that are not masked and not loaded during card initialization stage or personalization stage need their executables downloaded using a secure installation method, such as the post issuance download described in the previous figures. The applications can be loaded using the card domain cryptographic keys. The applications are then decrypted and can have their signature verified using the key services of the corresponding security domain 310. Therefore, the desired security domain(s) 310 preferably have encryption and signature keys installed prior to the post issuance download of the corresponding application.

In the example shown in FIG. 13, only one security domain 310 is shown since security domains 310 for other applications are not relevant to illustrate the downloading of a single application. Note that the result of the secure installation is initially a loaded application, which must then be installed, registered and personalized. After loading, the application is installed, preferably by issuing an install APDU command to card domain 308. An application can be installed when its install method has executed successfully. Memory allocations have been performed by the time an application is in an install state. A loaded application should also be registered. When an application is registered, it is selectable and it is ready to process and respond to APDU commands. Installation and registration may be performed simultaneously by the same APDU command. An application is also personalized after loading. A personalized application includes cardholder specific data and other required data which allows the application to run.

To allow personalization to be performed, the applet uses services of the security domain to load confidential data. The personalization key can be considered to be the confidential data. Note that all post issuance "PUT—KEY" commands must be MACed and encrypted. Further processing now requires the applet to be selected. After selecting the applet any additional applet keys may be loaded using the personalization key for encryption. Here the applet specific personalization rules may be applied.

In the example shown in FIG. 13, the cryptographic key and MAC/Signature key are shown to be included in the functions of card domain 308/security domain 310. If a security domain is associated with the application being loaded, then the security domain will be invoked. However, if no security domain 310 is associated with the application which is being loaded, then the cryptographic key and the signature key of card domain 308 will be utilized. In contrast to the install commands sent to the smart card during the initialization phase, the post issuance install command is not issued in a secured environment, therefore it is preferably protected with a cryptographic key, such as a MAC/Signature key. Note that the install does not populate key space, but only allocates key space within an applet.

Card domain 308 manages the post-issuance loading of a new application, while security domain 310 ensures the validity and integrity of the new application once the new application has been loaded onto the smart card. If a security domain 310 is not associated with the newly loaded application, then card domain 308 performs security domain's 310 functions. Once the new application is post-issuance downloaded, various keys such as a cryptographic key and a signature key are preferably utilized for installation and personalization of the application.

APPLET INSTALL COMMANDS EMBODIMENT

This section describes the APDU command response pairs used in the pre issuance and post issuance applet load and install of Open Platform compliant chip cards. The following APDU command response pairs are defined and shall be supported by the Open Platform Card Domain.

Security requirements may vary from one Applet Load/Install to another. The two security alternatives offered in the specification for server authentication by the card shall be supported by the Open Platform Card Domain. At the session level, the server is authenticated once at the beginning of the session (usage of External Authenticate command). At the command level, the server is authenticated at the unitary APDU command (usage of APDU command MACing). Security requirements typically differ between pre issuance and post issuance sessions. For example, pre issuance (identified by the Card Life Cycle Status set to "Masked" or "Initialized") server authentication is at the session level. At post issuance (identified by the Card Life Cycle Status set to "Personalized") server authentication is at the command level. The card authentication by the server is only offered at the session level (usage of Initialized Update command).

The Select command is used for selecting the Card Domain. The Card Domain may be selected either for loading a new applet (or Security Domain) or installing a previously loaded applet (or Security Domain). The Select command message includes the length of the AID and the Card Domain AID. The data field of the response message contains the file control information (FCI) specific to a Card Domain. The FCI returned by a successful selection includes an FCI template, a Card Domain name, proprietary data, applet production life cycle, maximum block length, and FCI discretionary data.

An "applet invalidated" warning condition may be returned by the integrated circuit card (ICC). This is a case where the card is blocked. Blocking the card results in that Card Domain may still be selected with this warning condition, while any other applet present on the card may not be selected any more and shall return the error condition "applet not found". The following error conditions may be returned by the ICC: no precise diagnosis, wrong length, applet not found, incorrect P1 P2.

The Initialize Update command is used to retrieve information data on the integrated circuit card key to be used for the current session and to obtain from the ICC some unique session data. It also initiates the computation by the card of a unique session key and the encryption of a given challenge from the server to the ICC using this session key. The response from the ICC consists of returning to the server some information valid for the session, i.e., key diversification data (card unique data), key information (key and algorithm references), session unique data (ICC challenge to the server), and a cryptogram. The server may verify the cryptogram, i.e. authenticate the ICC, prior to start the load/install process. A previous and successful execution of the Select command is required before processing the Initialize Update command. A success execution of the Initialize Update command is required before processing an Install command.

The data field of the response message contains the following data elements: key diversification data, key information data, card challenge to server, and cryptogram. The following error conditions may be returned by the ICC: no specific diagnosis, wrong length, conditions of use not satisfied, function not supported (which is the case when the card is blocked), and incorrect P1 P2.

The External Authenticate command asks the currently selected applet in the ICC, here Card Domain, to verify a cryptogram. The cryptogram is computed by encrypting the card challenge to the server returned in the Initialize Update response message using a single DES algorithm in ECB mode with the current session key. A previous and successful execution of the Initialize Update command is required before processing the External Authenticate command. The successful authentication of the server is required prior to the execution of any Install or Load command without Macing. In other words, during pre issuance load/install server authentication is required algorithms.

The External Authenticate command includes in a data field a cryptogram to verify. The key and algorithm references used to compute the cryptogram are known by the ICC un ambiguously, i.e., the session key and the algorithm identified in the Initialize Update response. An "Authentication Failed" warning condition may be returned by the ICC. The following error conditions may be returned by the ICC: no specific diagnosis; wrong length; authentication method blocked; conditions of use not satisfied; or incorrect P1 P2. Installing an applet or Security Do main needs the execution of different functions according to methods invoked by the Card Domain (e.g. install method, check signature). The Install command instructs the Card Domain on which installation step it shall perform. A previous and successful execution of the Initialize Update command is required before processing the Install command. MACing is required for this command when a previous External Authenticate command has not been successfully executed. The Install command message includes a reference control parameter, a security control parameter, length of the data field, data and MAC (if present). The reference control parameter of the Install command is coded to indicate the following meanings: RFU, register, install, load, and authorized. Regarding the register meaning, a future release may support this bit instructing the Card Domain to register a new applet (or Security Domain) into a specific security Domain. In the current release, any installed applet (or Security Domain) is automatically registered in the Card Domain.

Bits 1 to 4 of the reference control parameter control the sequencing of the load/install process. The following bit combinations are valid. The combination 0010 applies to a new applet (or Security Domain). It instructs the Card Domain to accept one or more subsequent Load Applet commands. The Card Domain shall automatically link the new applet or Security Domain (byte code) after the successful execution of the last Load Applet command. It shall not automatically invoke the install method of the Loaded Applet (or Security Domain) after the last Load Applet command. If the original Applet Life Cycle Status is other than "not available" an error condition shall be returned by the ICC.

The bit combination 0011 applies to a new applet (or Security Domain). It instructs the Card Domain to invoke the authorized method of the identified Security Domain with the new applet (or Security Domain) AID. It instructs the Card Domain to accept one or m ore subsequent Lo ad Applet comma nd s only after the authorized method has been successfully executed. The Card Domain should automatically link the new applet (or Security Domain) after the successful execution of the last Load Applet command. It shall not automatically invoke the install method of the loaded applet (or Security Domain) after the last Load Applet command. If the original Applet Life Cycle Status is other than "not available", an error condition is returned by th e ICC.

The bit combination 0100 applies to a previously loaded applet (or Security Domain. It instructs the Card Domain to invoke the install method of the identified applet (or Security Domain) with the install parameters present in the Install command data field. If the Original Life Cycle Status is other than "loaded" an error condition shall be returned by the ICC. A future release will support a combined load and installation of a new applet (or Security Domain).

The security control parameter of the Install command includes the following meanings: RFU; checksum; decrypt; and check signature. Regarding checksum, a future release will support this bit instructing the Card Domain to invoke the checksum method. When loading a new applet (or Security Domain) as indicated in the reference control parameter bits 1 to 3 allow cryptographic controls over the load/install process. The following bit combinations are valid. The bit combination 001 applies to a new applet (or Security Domain). It instructs the Card Domain to invoke the check signature method of the identified Security Domain with the applet (or Security Domain) AID after the successful execution of the last Load Applet command. The bit combination 010 applies to a new or previously Loaded Applet (or Security Domain). It instructs the Card Domain to invoke the decrypt method of the identified Security Domain with the applet (or Security Domain) AID after the successful execution of the last Load Applet command.

The bit combination 011 Applies to a new or previous Loaded Applet (or Security Domain). It instructs the Card Domain to invoke the check signature and decrypt methods of the identified Security Domain with the applet (or Security Domain) AID. The check signature method shall be revoked after the successful execution of the last Load Applet command. The decrypt method shall be automatically revoked only after the check signature method has been successfully executed. The data field of the Install command message contains the following data elements: applet identifier length indicator; AID; Security Domain identifier length indicator; Security Domain identifier; install parameters length indicator; install parameters; and MAC.

The following error conditions may be returned by the ICC: no specific diagnosis, security status not satisfied, conditions of use not satisfied, secure messaging data object missing, secure messaging data object incorrect, incorrect P1 P2, invalid Life Cycle State, authorization failed, applet load failed, signature check failed, decryption failed, checksum failed, installation failed, or registration failed.

This section defines the byte code block structure as transmitted in the load Applet command data field for loading an applet (or Security Domain). The Load Applet command loads one byte code block at the time. Byte code blocks are numbered. The first byte code block shall be numbered 00. The blocked number shall be strictly sequential and incremented by one. The card shall be informed of the last block. After receiving the last block, the card shall execute the internal process, if any, identified in the security control parameter of the previous Install command. A previous and successful execution of the Install command with its reference control parameter instructing a load is required before processing the Load Applet command. MACing is required for this command when a previous External Authenticgate command has not been successful executed. In other words, MACing is not required during pre issuance load/install.

The load applet command message includes a reference control parameter, block number, length of the block, and byte code block. The data field of the command message contains the byte code block. If a MAC is present, the key and algorithm references used to compute it are known by the ICC unambiguously, i.e., the session key and algorithm identified in the Initialized Update response.

The following error conditions may be returned by the ICC: no specific diagnosis, memory failure, security status not satisfied, conditions of use not satisfied, secure messaging data object missing, secure messaging data object incorrect, not enough memory space, invalid block number, applet load failed, signature check failed, decryption failed, or check sum failed.

APDU INITIALIZATION AND PERSONALIZATION COMMANDS EMBODIMENT

This section describes the APDU command response pairs used for pre issuance and post issuance initialization, personalization and audit of Open Platform compliant chip cards. The following APDU command response pairs are defined: Get Data, Set Status, Select, Initialize Update, External Authenticate, Put Key, Update Record, Update Binary, Put Data, Pin Change/Unblock, and Update Parameter.

Security requirements are applet specific. Two security alternatives are offered in this specification for server authentication by the card. At the session level, the server is authenticated once at the beginning of the session (usage of External Authenticate command). At the command level, the server is authenticated at the unitary APDU command (usage of APDU command MACing). Two security alternatives are also offered in this specification for card authentication by he server. At the section level, the card is authenticated once at the beginning of the session (usage of Initialize Update command). At the command level, the card is authenticated at the unitary APDU command (usage of Update Parameter response MACing). These different security mechanisms may be combined during a session. An applet may also require different security mechanisms during the card life such as a stricter security at post issuance then at pre issuance.

The Get Data command is used to retrieve data objects such as: card production life cycle data, card life cycle status, applet life cycle status, applet personalization key information, or applet production life cycle data of the currently select applet.

The Set Status command is used for incrementing the life cycle status data of the card or the currently selected applets. The state parameter of the Set Status command message includes the following meanings: applet personalized/card load secured and initialized. The reference control parameter of the Set Status command includes the following meanings: card life cycle status, and applet life status. The bit combination 10 for the reference control parameter applies for setting the card cycle life status. It instructs the card domain to increment the state of the card life cycle status. If the Card Domain is not the currently selected environment, an error condition shall be returned by the ICC. In this case, the following combinations for bits of the state parameter of the Set Status command are valid. Bit combination 001 sets card life cycle status from Masked to Initialize. Bit combination 100 sets card life cycle status from Initialized to Load Secured. If the original card life cycle status is other than Masked or Initialized, an error condition shall be returned by the ICC. Blocking the card is ensured using the Card Block command. A blocked card may not be unblocked.

Bit combination 01 of the reference control parameter applies for setting the applet life cycle status. It instructs the currently selected applet to increment its state. If an applet is not the currently selected applet, an error condition shall be returned by the ICC. In this case, the following combination for bits of the state parameter is valid. Bit combination 100 sets Applet Life Cycle Status from Registered to Personalized. If the Original Life Cycle Status is other than Registered, an error condition shall be returned by the ICC. The following state transitions are automatically managed by the Card Domain during the Load/Install process and not by the Set Status command: from Not Available to Loaded, from Loaded, from Loaded to Installed, from Installed to Registered. Blocking an applet is insured using the Applet Block command. Unblocking an applet is insured using the Applet Unblock command. In a future release, the applet installer will allow applet deletion and will manage automatically the state transitions to Not Available.

The following error conditions may be returned by the ICC: no precise diagnosis, memory failure, security status not satisfied, conditions of use not satisfied, secure messaging data object missing, secure messaging data object incorrect, incorrect P1 P2, or invalid life cycle state.

The Select command selects the ICC applet corresponding to the submitted AID, i.e., an Applet, Card Domain, or Security Domain. The response from the ICC consists of returning the Applet, Card Domain or Security Domain file control information (FCI). The data field of the command message contains the AID of the Applet, Card Domain or Security Domain. The data field of the response message contains the FCI specific to the Applet Card Domain or Security Domain. The warning condition "applet invalidated" may be returned by the ICC. This is the case where the applet is present by is blocked. The following error conditions may be return by the ICC: no precise diagnosis, wrong length, function not supported (this is a case where the applet is present but the card is blocked), applet not found (this is a case where the applet does not exist in the ICC or is present but not yet installed) or incorrect P1 P2.

The Initialize Update command is used to retrieve information data on the ICC key to be used for the current session and to obtain from the ICC some unique session data. It may initiate the computation by the card of a unique section key. It may also initiate the encryption of a given challenge from the server to the ICC using -he unique session key. The response from the ICC consists of returning to the server some information valid for the session such as: key diversification data (card unique data), key information (key and algorithm references), session unique data, arid optionally a cryptogram. The server may verify the cryptogram i.e., authenticate the ICC, prior to the start of the personalization process. A previous and successful execution of the Select command is required before processing the Initialize Update command. The reference of the key is known by the ICC unambiguously. Any other value uniquely identifies the key index within the key set identified in the command message data field. The key index in conjunction with the key set identifier uniquely identifies the key and the algorithm to be used: both references are only applicable to the current context, i.e. the currently selected Applet, Card Domain or Security Domain. When a bit of the reference control parameter is set, the data field of the command message is applet specific and typically contains server session data including some or all of the following data elements: key set identifier, challenge to ICC.

The External Authenticate command will ask the currently selected applet in the ICC to verify a cryptogram. The cryptogram is computed by encrypting the card session unique data returned in the Initialize Update response message with a unique per card applet (or Unique per session) key. A previous and successful execution of the Initialize Update command is required before processing the External Authenticate command. The key and algorithm references used to compute the cryptogram are known by the ICC explicitly, e.g., the ones identified in the initialized update to response. The data field of the command message contains the cryptogram to verify. The warning condition "authentication failed" may be returned by the ICC. The following error conditions may be returned by the ICC: no specific diagnosis, wrong length, authentication blocked, conditions of use no satisfied or incorrect P1 P2.

The Put Key command is used to store or replace a key set (containing one or more keys) or a specific key within a key set with the data provided in the command data field. When already existing in the ICC, the current key set or specific key shall be replaced. A key is identified by a key index within a key set and a key set is identified by a key set identifier: both references are only applicable to the current context, i.e., the currently selected Applet, Card Domain or Security Domain. The value P2 or the Put Key command message shall be set to 00 when more than one key is transmitted to the ICC. P2 shall indicate the key index when a single key is transmitted to the ICC. The key index in conjunction with the reference to the key set of the currently selected applet (or Card Domain or Security Domain) uniquely identifies the key to be stored/replaced.

The reference control parameter indicates if the command data field contains one or more keys. If the command data field contains multiple keys it is coded according to the following structure, including the identification of empty key set entries and the end key set delimiter: a key set identifier is followed by pairs of key indexes, each key index has an algorithm identifier and a key data field.

When the command data field contains only one key (of which the key index is given in P2), it is coded according to the following structure: a key set identifier is followed by an algorithm identifier and a key data field.

Depending on the buffering capability of the ICC for both APDU reception and data decryption, transmitting the keys to the ICC may require one or more command messages. A bit of the reference control parameter indicates if (at least) one subsequent command message shall be expected. When the bit is set, the current APDU is the last (or only) one. When the bit is reset, a subsequent APDU shall be expected and shall refer to the same key index if the current parameter P2 is not set to zero. This case is particular applicable to large keys such as RSA. If parameter P2 of the subsequent APDU is different from the previous one, an error condition shall be return by the ICC.

The command message data field contains (part of) an encrypted key set structure. The entire key set structure (i.e., the key set identifier and key set entries) shall be encrypted. When replacing multiple existing keys, the new key set shall be presented with the same number or keys and the same length for each key as it exists within the card. When replacing a single existing key, the new key shall be presented with the same length as it exists with the card. A future release will support replacement of a key set with a different number of keys and keys with different lengths. If the algorithm identified in the algorithm identifier is not supported, an error condition shall be returned by the ICC. The reference of the encrypting key and algorithm to be used are known implicitly by the ICC according to the current context i.e., the current selected Applet, Card Domain or Security Domain. If a MAC is present, the key and algorithm references used to compute it are known by the ICC implicitly e.g. the ones identified in the initialize update response.

The data field of the response message contains in clear text the key set identifier followed by the key check values presented to the ICC encrypted in the command. These returned key set identifier and key check values may be used by the personalization server to verify the correct decryption by the ICC of the encrypted key set. In other words, this may be used by the server for validating key personalization/update. The following error conditions may be returned by the ICC: no specific diagnosis, memory failure, wrong length, security states not satisfied, conditions of use not satisfied, secure data object missing, secure messaging data object incorrect, incorrect parameters in the data field, not enough memory space, incorrect P1 P2, referenced data not found, algorithm not supported, or invalid key check value. A future release will support ICC internal verification of key check value before key personalization update.

The Update Record command is used to store or replace a record in a linear or cyclic file with the data provided in the command data field. Here it is assumed that before personalization, the Applet (or Security Domain) install process includes both the creation of all the required linear and cyclic files with the appropriate format, number of records, and access conditions and the creation of all the required records of fixed or variable length. If the applet install process only creates the files but not records, the Append Record command shall be used. When already existing in the ICC, the current record shall be replaced. The Update Record command record message includes a record number to be updated, a reference control parameter, a length of the record data, and the record data.

The data field of the command message contains the new record data in clear text. A future release will support personalization of records presented encrypted to the ICC. If the record already exists, the new data is presented in the same format (including the record template tag and length when defined) and with the same length as it exists within the current record in the card. If a MAC is present, the key and algorithm references used to compute it are known by the ICC explicitly, e.g., the ones identified in the initialize update response.

The following error conditions may be returned by the ICC: no specific diagnosis, memory failure, wrong length, command incompatible with file structure, security status not satisfied, condition of use not satisfied, secure messaging data object missing, secure messaging data object incorrect, file not found, record not found, or incorrect P1 P2.

The Append Record command is used to store (but not replace) a single record as a new record at the end of a linear file or at the beginning of a cyclic file with the data provided within the command data field. Here it is assumed that before personalization, the Applet (or Security Domain) install process includes the creation of all the required linear and cyclic files with the appropriate format, number of records and access conditions but does not include the creation of the records; themselves. If the install process creates all the required records the update record command shall be used. On a successful execution of the command, the ICC increments the record numbering of the file. The first record of a file is numbered 01.

The Append Record message includes a reference control parameter, length of record data and the record data. The data field of the command message contains the new record data in clear text. A future release will support personalization of records presented encrypted to the ICC. The entire record data will be encrypted as a unit. If a MAC is present, the key and algorithm references used to compute it are known by the ICC explicitly, e.g., the ones identified in the Initialize Update response.

The Update Binary command message includes a reference control parameter, a binary offset from the beginning of the file, length of the binary data and the binary data. The data field of the command message contains new binary data in clear text. A future release will support personalization of transparent files presented encrypted to the ICC. The entire sequence of binary data will be encrypted as a unit. If already existing, the new binary data is presented with the same format and length as it exists within the current file in the card. If a MAC is present, the key and algorithm references used to compute it are known by the ICC explicitly, e.g., the ones, identified in the Initialize Update response.

The Put Data command message includes a data object tag. The data field of the command message contains in clear text the new data objects. A future release will support personalization of TLV coded data objects presented encrypted to the ICC. If already existing, the new data objects will be presented with the same format and length as it exists within the card. A future release will support replacement of data objects with different lengths. If a MAC is present, the key and algorithm references used to compute it are known by the ICC explicitly, e.g., the ones identified in the Initialize Update response. The following errors may be returned by the ICC: no specific diagnosis, memory failure, wrong length, security status; not satisfied, conditions of use not satisfied, secure messaging data missing, secure messaging data object incorrect, incorrect parameters in the data field, not enough memory space, incorrect P1 P2, or data object not found.

The PIN Change/Unblock command is used to store or place a PIN value and reset the associated PIN try counter to the value of the PIN try limit within the currently selected applet. When already existing in the ICC, the current PIN shall be replaced. The PIN-Change/Unblock command message includes a reference control parameter, a length of PIN, and the encrypted PIN. The data field of the command message contains the encrypted PIN value. If already existing, the new PIN shall be presented with the same format and length as it exists within the card. A future release will support replacement with a PIN of a different length. When resetting the PIN try-counter, if the PIN try-limit data does not exist, an error condition shall be returned by the ICC. The reference of the encrypting key and the algorithm to be used are known implicitly by the ICC according to the current context, that is typically triple DES algorithm in ECB mode with double length applet personalization (or update) key. If a MAC is present, the key and algorithm references used to compute it are known by the ICC unambiguously, e.g. the ones identified in the Initialize Update response.

The following error conditions may be returned by the ICC; no specific diagnosis, memory failure, wrong length, security status not satisfied, conditions of use not satisfied, secure messaging data object missing, secure messaging data object incorrect, incorrect parameters in the data field, not enough memory space, incorrect P1 P2, or reference data not found.

The Update Parameter command is used to store or replace one or more: tagged data objects provided in the command data field. It also returns to the server a cryptographic proof of its execution. When already existing in the ICC, the current data objects shall be replaced. The reference control parameter of the update parameter command message includes the following meanings; coding according to this specification, clear text data field, and encrypted data field.

The data field of the command message contains a challenge to the ICC from the server followed by the new data objects. When a bit of the reference control parameter is reset, the new data objects are presented to the ICC in clear text. When a bit of the reference control parameter is set, the new data objects are presented to the ICC encrypted. The entire sequence of (one or more) TLV coded data objects, including tags and lengths, will be encrypted as a unit, without any padding of the individual data objects.

Security related command messages (e.g. Initialized Update, Put Key) refer to algorithms and keys in the ICC. The reference may be explicit or implicit. This section defines the key set structure as transmitted in the Put Key command data field. It does not define the ICC internal handling or storage of keys.

A specific key is associated with one and only one algorithm. The algorithm-key pair is defined as a key set entry in a key set. Identifying a key set entry and a key set allows for explicitly referencing an algorithm/key pair (e.g. MAC verification, using triple DES in CBC mode with a double key length). Such referencing prevents from misusing keys or algorithms. A key set is a table algorithm and key pairs valid for the execution of a security related command. A key set may contain one or more algorithm/key pairs. A key set identifier identifies the key set within the current context, i.e. the currently selected applet. In other words, the key set identifier value is relative to the current applet. This implies that a similar value for a key set identifier may be used by different applets. Different key set identifiers are used to differentiate different key versions.

A key set contains a variable number key set entries. A key set entry is an algorithm/key pair valid for the execution of a security related command. A key index identifies the key set entry of the key set identified in the current context, i.e. the currently selected applet. In other words, the key index value is relative to the current key set. This implies that a similar value for a key index may be used by different key sets within a single applet. The first entry of a key set is referred to as the Key Index 01. Different key indexes within one key set may be used to differentiate different key usage and function. Each key set entry is divided into two parts, namely the algorithm identifier and the key data field. The algorithm identifier is coded on one byte according to a table and includes the following meanings; DES-ECB mode, DES-CBC mode, symmetric algorithm, RSA public key, RSA private key, RSA private key-Chinese remainder, and asymmetric algorithms.

A method and system for a smart card domain and a security domain has been disclosed. Software written according to the present invention may be stored in some form of computer-readable medium, such as memory or CD-ROM, or transmitted over a network, and executed by a processor. Although the present invention has been described in accordance with the embodiment shown, one of ordinary skill in the art will readily recognize that there could be variations to the embodiment and these variations would be within the spirit and scope of the present invention. Accordingly, many modifications may be made by one of ordinary skill in the art without departing from the spirit and scope of the appended claims.

What is claimed is:

1. A method for loading a smart card application onto a smart card after said smart card has been issued to a cardholder, said method comprising:

issuing said smart card to a cardholder, said smart card including a card domain application arranged to manage the post-issuance loading of applications;

establishing communication between said smart card and a provider of said smart card application;

loading said smart card application onto said smart card under control of said card domain application; and checking a cryptographic signature of said smart card application using said card domain application, whereby said smart card application is loaded onto said smart card post-issuance in a secure manner.

2. A method as recited in claim 1 further comprising:

providing a cryptographic signature key to said card domain application before said smart card application is loaded onto said smart card;

signing said smart card application using said cryptographic signature before said smart card application is loaded onto said smart card, said cryptographic signature being calculated using said cryptographic signature key;

calculating said cryptographic signature of said smart card application once said smart card application has been loaded onto said smart card, said calculating being performed by said card domain application using said cryptographic signature key provided to said card application, whereby said element of checking may be performed by said card domain application.

3. A method as recited in claim 1 further comprising:

decrypting said smart card application by said card domain application once said smart card application has been loaded, whereby said smart card application is loaded onto said smart card post-issuance in a secure manner.

4. A method as recited in claim 3 further comprising:

providing a cryptographic encryption key to said card domain application before said smart card application is loaded onto said smart card;

encrypting said smart card application using said cryptographic encryption key before said smart card application is loaded onto said smart card; and wherein said element of decrypting being performed by said card domain application uses said cryptographic encryption key provided to said card domain application, whereby said smart card application is loaded onto said smart card post-issuance in a secure manner.

5. A method as recited in claim 1 further comprising:

loading personalization data for said smart card application onto said smart card under control of said card domain application; and checking a cryptographic signature of said personalization data using said card domain application, whereby said personalization data for said smart card application is loaded onto said smart card post-issuance in a secure manner.

6. A method as recited in claim 1 wherein said smart card further includes a security domain application arranged to manage the security of post-issuance loading of applications, and said element of checking is performed by said security domain application.

7. A method as recited in claim 1 wherein details of said element of checking said cryptographic signature are kept confidential from an issuer of said smart card.

8. A method for loading a smart card application onto a smart card after said smart card has been issued to a cardholder, said method comprising:

issuing said smart card to a cardholder, said smart card including a card domain application arranged to manage the post-issuance loading of applications and a security domain application arranged to manage the security of post-issuance loading of applications;

establishing communication between said smart card and a provider of said smart card application;

loading said smart card application onto said smart card; and invoking a cryptographic service of said security domain application to validate said smart card application, whereby said smart card application is loaded onto said smart card post-issuance in a secure manner.

9. A method as recited in claim 8 further comprising:

providing a cryptographic signature key to said security domain application before said smart card application is loaded onto said smart card;

signing said smart card application using a cryptographic signature before said smart card application is loaded onto said smart card, said cryptographic signature being calculated using said cryptographic signature key;

calculating said cryptographic signature of said smart card application once said smart card application has been loaded onto said smart card, said calculating being performed by said security domain application using said cryptographic signature key provided to said security domain application, whereby said smart card application is validated.

10. A method as recited in claim 8 further comprising:

decrypting said smart card application by said security domain application once said smart card application has been loaded, whereby said smart card application is validated.

11. A method as recited in claim 10 further comprising:

providing a cryptographic encryption key to said security domain application before said smart card application is loaded onto said smart card;

encrypting said smart card application using said cryptographic encrypt ion key before said smart card application is loaded onto said smart card; and wherein said element of decrypting being performed by said security domain application uses said cryptographic encryption key provided to said card domain application.

12. A method as recited in claim 8 further comprising:

loading personalization data for said smart card application onto said smart card; and invoking a cryptographic service of said security domain application to validate said personalization data, whereby said personalization data for said smart card application is loaded onto said smart card post-issuance in a secure manner.

13. A method as recited in claim 8 wherein details of said element of invoking a cryptographic service are kept confidential from an issuer of said smart card.

14. A method as recited in claim 8 wherein said cryptographic service provides encryption, decryption, MACing, hashing or a digital signature technique.

15. A smart card arranged to load an application onto said smart card after said smart card has been issued to a cardholder, said smart card comprising:
- a card domain application arranged to manage loading of said application onto said smart card; and
- a security domain application arranged to manage the security of post-issuance loading of applications, said security domain application including
  - a cryptographic key associated with said application,
  - a cryptographic service for validating said application after said application has been loaded post-issuance, said cryptographic service using said cryptographic key, and
  - a key management function associated with said cryptographic key, whereby said application may be loaded onto said smart card post-issuance in a secure manner using said security domain application.

16. A smart card as recited in claim 15 wherein said cryptographic key is an encryption key and wherein said cryptographic service is decryption, whereby said security domain application may decrypt said application after loading of said application onto said smart card.

17. A smart card as recited in claim 15 wherein said cryptographic key is a signature key and wherein said cryptographic service calculates a digital signature, whereby said security domain application may check a signature of said application after loading of said application onto said smart card.

18. A smart card as recited in claim 15 wherein said key management function is loading or updating of a key.

19. A smart card as recited in claim 15 wherein security aspects of said security domain application are kept confidential from said card domain application.

20. A smart card arranged to load a plurality of applications onto said smart card after said smart card has been issued to a cardholder, said smart card comprising:
- a card domain application arranged to manage loading of said applications onto said smart card;
- a first security domain application arranged to provide security for a first application to be loaded post-issuance, said first security domain application including
  - a first cryptographic key associated with said first application, said first cryptographic key being kept secret from said card domain and from a second security domain application; and
- said second security domain application arranged to provide security for a second application to be loaded post-issuance, said second security domain application including
  - a second cryptographic key associated with said second application, said second cryptographic key being kept secret from said card domain and from said first security domain application, whereby said first and second applications may be loaded securely post-issuance using said first and second cryptographic keys, respectively.

21. A smart card as recited in claim 20 wherein said first cryptographic key is an encryption key or a signature key and wherein wherein said second cryptographic key is an encryption key or a signature key.

22. A smart card as recited in claim 20 further comprising:
- a cryptographic service included with said first security domain for validating said first application after said first application has been loaded post-issuance, said cryptographic service using said first cryptographic key, the details of said cryptographic service being kept secret from said card domain application and from said second security domain application.

23. A smart card as recited in claim 20 further comprising:
- a key management function included with said first security domain application.

24. A smart card as recited in claim 23 wherein said key management function is loading or updating of a key.

* * * * *